US00RE39553E

(19) United States
(12) Reissued Patent
Li

(10) Patent Number: US RE39,553 E
(45) Date of Reissued Patent: Apr. 10, 2007

(54) SOX TOLERANT NOX TRAP CATALYSTS AND METHODS OF MAKING AND USING THE SAME

(75) Inventor: Yuejin Li, Edison, NJ (US)

(73) Assignee: Englhard Corporation, Iselin, NJ (US)

(21) Appl. No.: 10/460,009

(22) Filed: Jun. 12, 2003

Related U.S. Patent Documents

Reissue of:
(64) Patent No.: 6,419,890
Issued: Jul. 16, 2002
Appl. No.: 09/634,228
Filed: Aug. 9, 2000

(51) Int. Cl.
*B01D 53/54* (2006.01)
*B01D 53/60* (2006.01)

(52) U.S. Cl. ..... 423/239.1; 423/213.5; 423/244.1; 502/80; 502/84; 502/302; 502/303; 502/304; 502/326; 502/327

(58) Field of Classification Search ..... 423/213.5, 423/239.1, 239.2, 244.01, 244.04, 244.02, 423/244.07, 244.09, 244.1; 502/80, 84, 325, 502/326, 327, 328, 524, 339, 302, 303, 304
See application file for complete search history.

(56) References Cited

U.S. PATENT DOCUMENTS

| | | | | |
|---|---|---|---|---|
| 5,407,652 | A | * | 4/1995 | Swamy et al. ..... 423/239.1 |
| 5,705,136 | A | * | 1/1998 | Drago et al. ..... 423/239.1 |
| 5,727,385 | A | * | 3/1998 | Hepburn ..... 60/297 |
| 5,750,082 | A | * | 5/1998 | Hepburn et al. ..... 423/213.5 |
| 5,753,192 | A | * | 5/1998 | Dobson et al. ..... 422/177 |
| 5,758,489 | A | * | 6/1998 | Hepburn et al. ..... 60/274 |
| 5,795,553 | A | * | 8/1998 | Lott et al. ..... 423/213.2 |
| 5,910,097 | A | * | 6/1999 | Boegner et al. ..... 60/278 |
| 6,338,831 | B1 | * | 1/2002 | Strehlau et al. ..... 423/244.07 |

FOREIGN PATENT DOCUMENTS

| | | | |
|---|---|---|---|
| EP | 589 393 | A2 * | 9/1993 |
| EP | 0 640 379 | A2 * | 8/1994 |
| EP | 0 640 379 | A1 * | 8/1994 |
| EP | 669 157 | A1 * | 2/1995 |
| EP | 764 459 | A2 * | 9/1996 |
| EP | 764 460 | A2 * | 9/1996 |
| EP | 778 072 | A2 * | 11/1996 |
| EP | 0 945 165 | A2 * | 9/1999 |
| EP | 0945 608 | A2 * | 9/1999 |
| WO | WO 96/05140 | * | 2/1996 |
| WO | WO 97/48480 | * | 12/1997 |
| WO | WO 00/32300 | * | 6/2000 |

OTHER PUBLICATIONS

International Search Report PCT US/01/24033.

* cited by examiner

*Primary Examiner*—Colleen P. Cooke
(74) *Attorney, Agent, or Firm*—Richard A. Negin

(57) ABSTRACT

The present invention relates to sulfur tolerant catalyst composites useful for reducing contaminants in exhaust gas streams, especially gaseous streams containing sulfur oxide contaminants. More specifically, the present invention is concerned with improved NOx trap catalysts for use in diesel engines as well as lean burn gasoline engines. The sulfur tolerant NOx trap catalyst composites comprise a platinum component, a support, a NOx sorbent component, and a spinel material prepared by calcining as anionic clay material represented by the formula $M_mN_n(OH)_{(2m+2n)}A_a.bH_2O$, wherein the formula is defined herein. The sulfur tolerant NOx trap catalyst composites are highly effective with a sulfur containing fuel by trapping sulfur oxide contaminants which tend to poison conventional NOx trap catalysts used to abate other pollutants in the stream. The sulfur tolerant NOx trap catalyst composites are suitable for diesel engines because the composites can be regenerated at moderate temperatures with rich pulses, rather than at high temperatures.

74 Claims, 6 Drawing Sheets

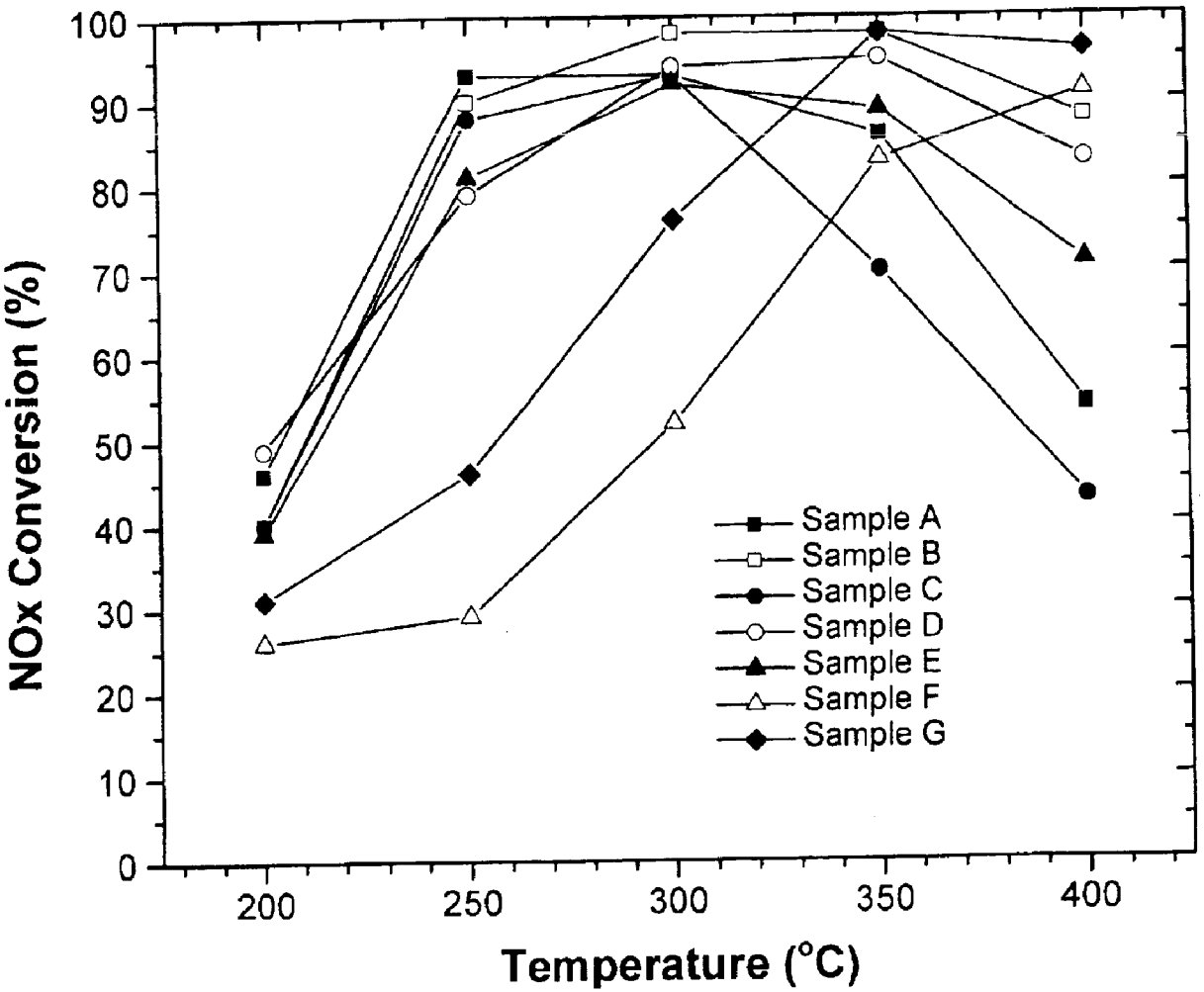
FIG.1: Comparison of $NO_x$ Conversions of Sample A to G
NOx Conversion (%)
100
90
80
70
60
50
40
30
20
10
0
200
250
300
350
400
Temperature (°C)
Sample A
Sample B
Sample C
Sample D
Sample E
Sample F
Sample G

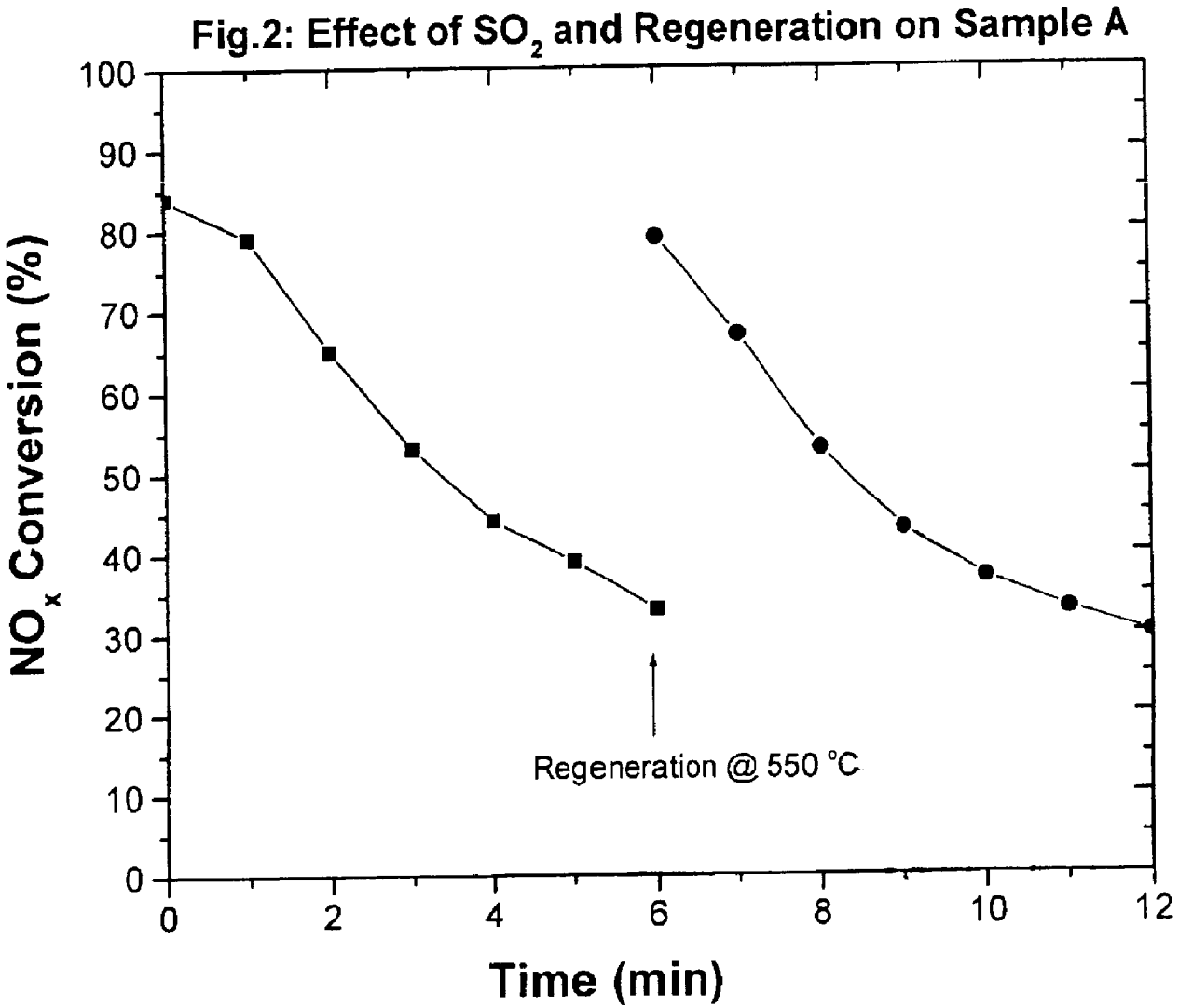
Fig.2: Effect of $SO_2$ and Regeneration on Sample A
$NO_x$ Conversion (%)
100
90
80
70
60
50
40
30
20
10
0
0
2
4
6
8
10
12
Time (min)
Regeneration @ 550 °C

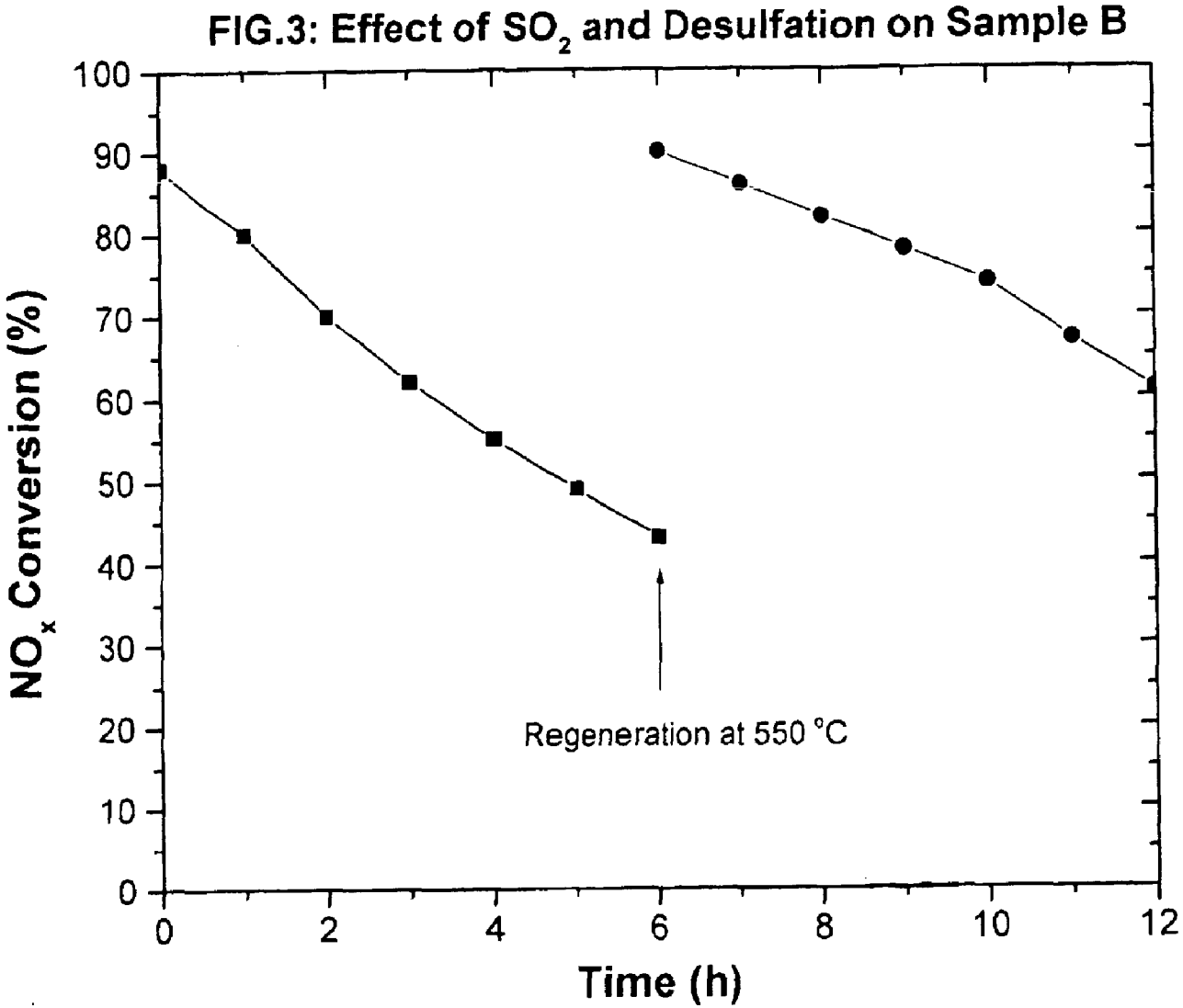
FIG.3: Effect of $SO_2$ and Desulfation on Sample B
$NO_x$ Conversion (%)
100
90
80
70
60
50
40
30
20
10
0
Time (h)
0
2
4
6
8
10
12
Regeneration at 550 °C

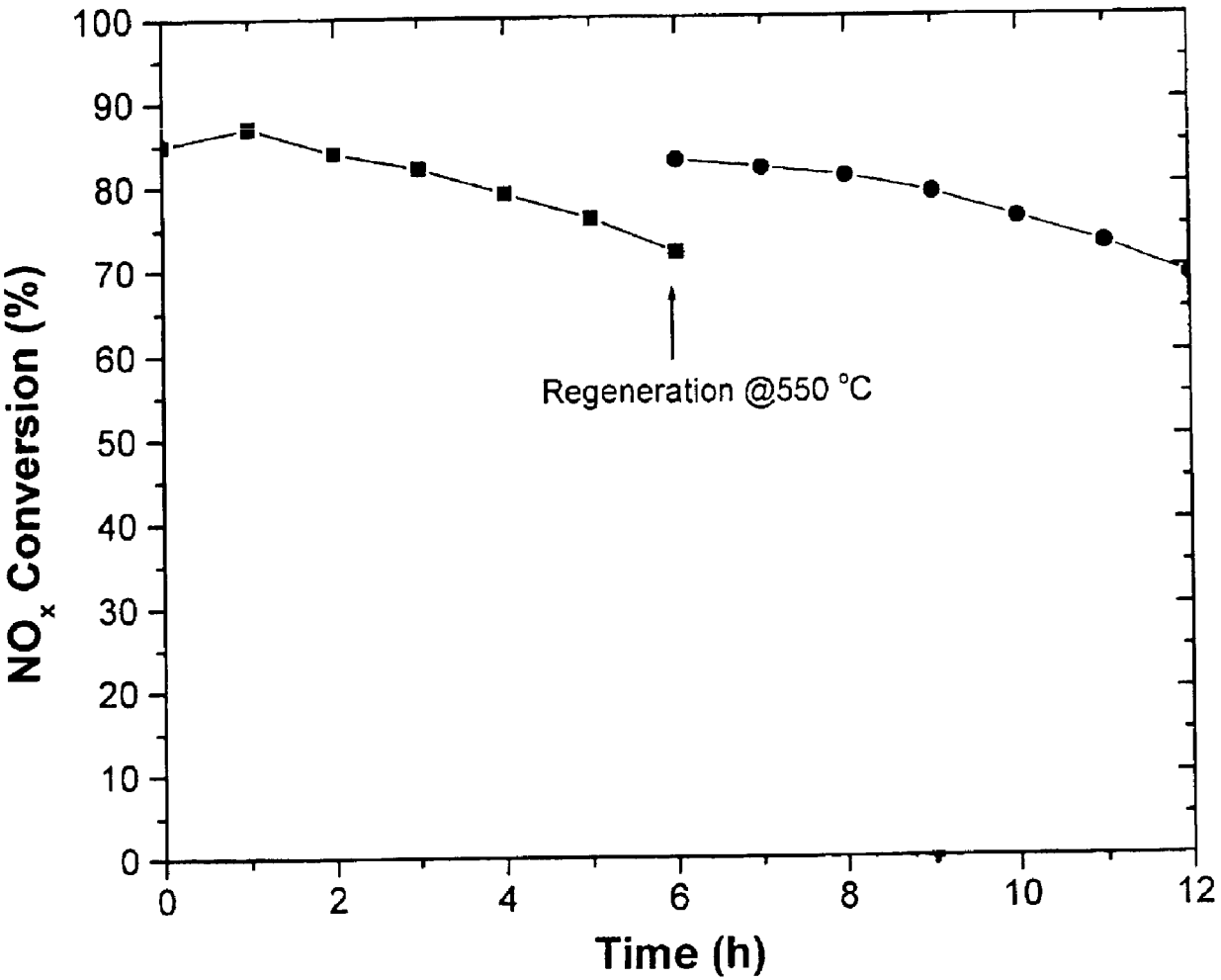
FIG.4: Effect of $SO_2$ and Desulfation on Sample D
$NO_x$ Conversion (%)
100
90
80
70
60
50
40
30
20
10
0
Time (h)
0
2
4
6
8
10
12
Regeneration @550 °C

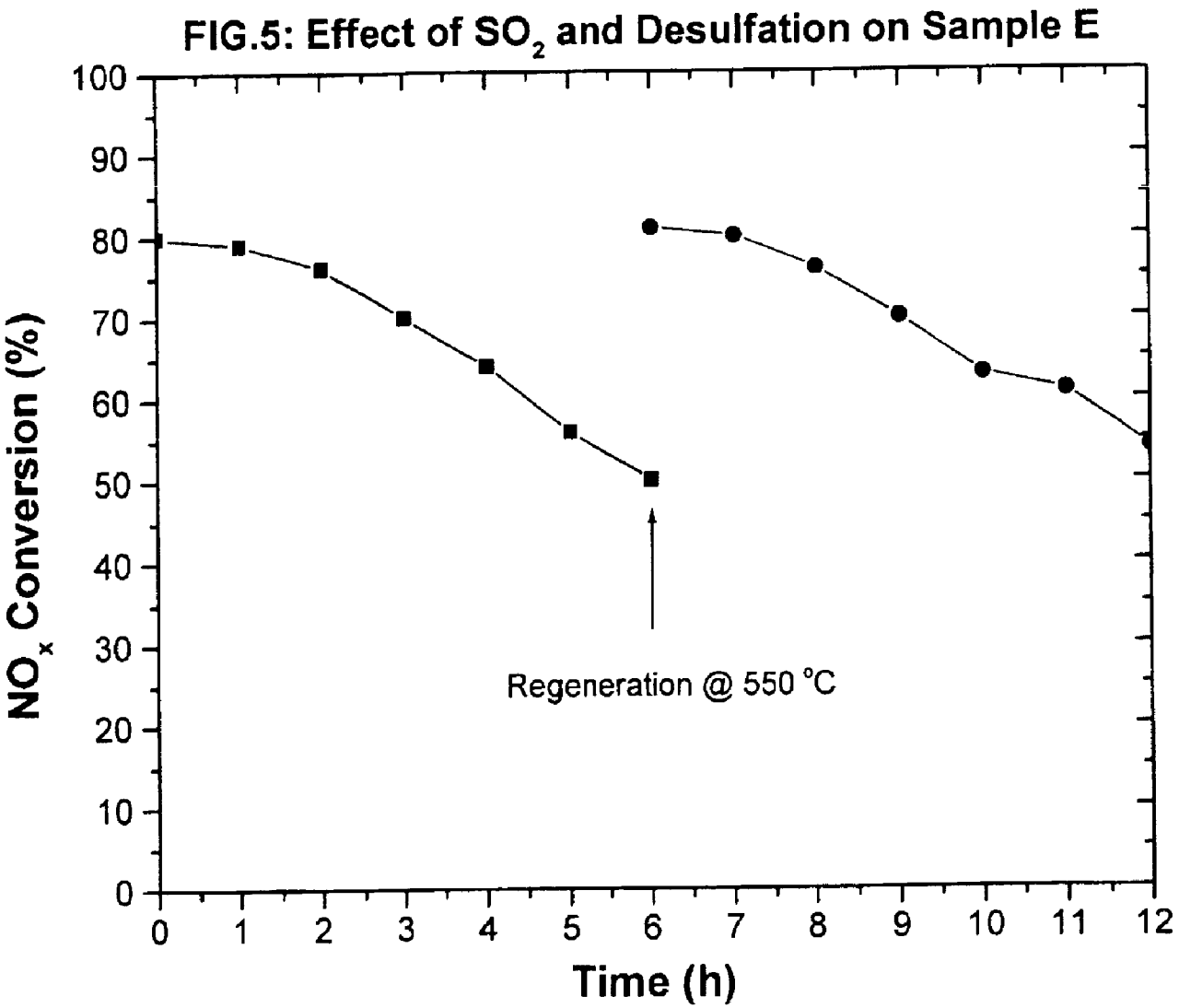
FIG.5: Effect of $SO_2$ and Desulfation on Sample E
$NO_x$ Conversion (%)
Time (h)
Regeneration @ 550 °C
0
10
20
30
40
50
60
70
80
90
100
0
1
2
3
4
5
6
7
8
9
10
11
12

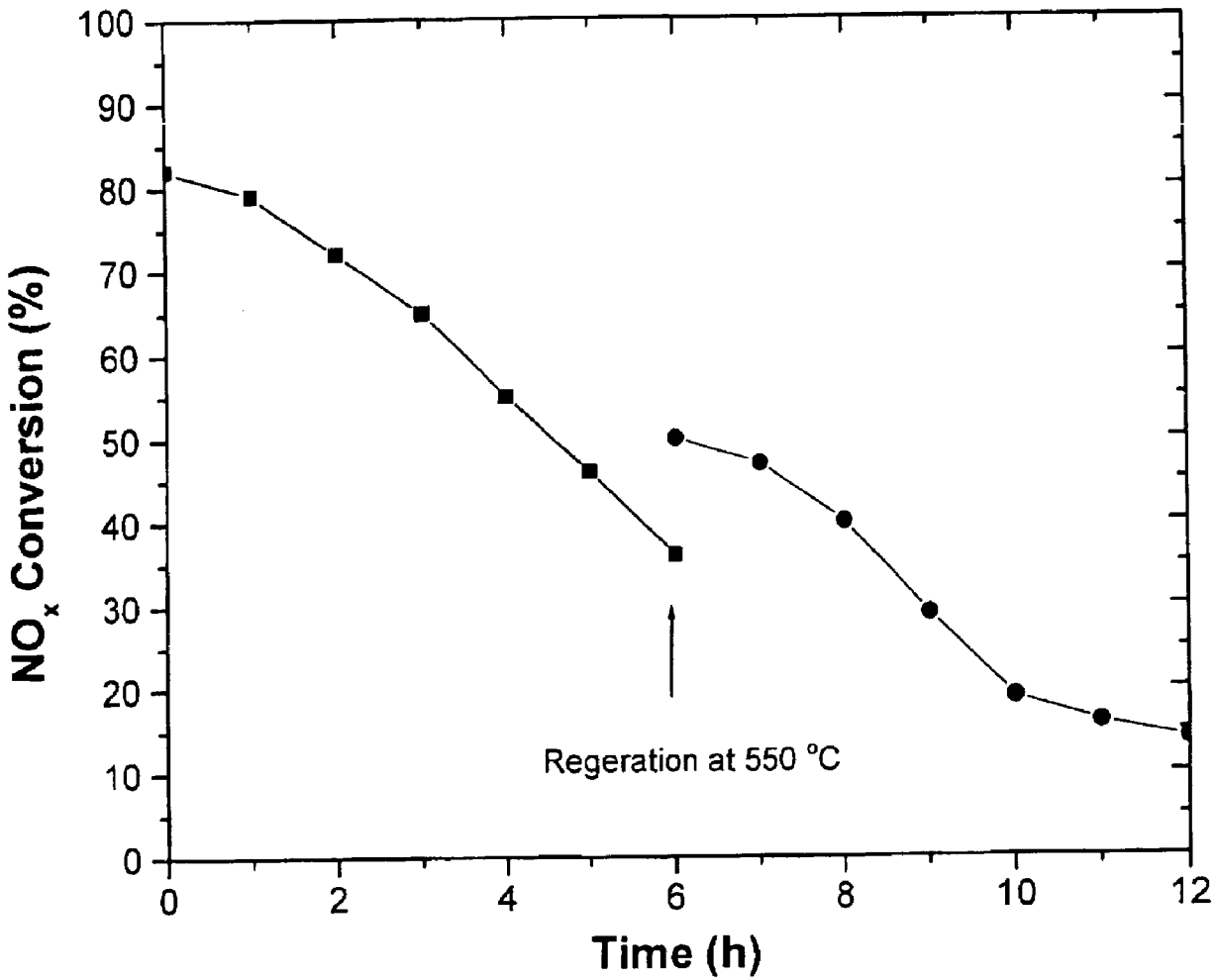
FIG. 6: Effect of $SO_2$ and Desulfation on Sample F

SOX TOLERANT NOX TRAP CATALYSTS AND METHODS OF MAKING AND USING THE SAME

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to sulfur tolerant catalyst composites useful for reducing contaminants in exhaust gas streams, especially gaseous streams containing sulfur oxide contaminants. More specifically, the present invention is concerned with improved NOx trap catalysts for use in diesel engines as well as lean burn gasoline engines. The sulfur tolerant NOx trap catalyst composites comprise a platinum component, a support, a NOx sorbent component, and a spinel material prepared by calcining an anionic clay material represented by the formula $M_mN_n(OH)_{(2m+2n)}A_a.bH_2O$, wherein the formula is defined herein. The sulfur tolerant NOx trap catalyst composites are highly effective with a sulfur containing fuel by trapping sulfur oxide contaminants which tend to poison conventional NOx trap catalysts used to abate other pollutants in the stream. The sulfur tolerant NOx trap catalyst composites are suitable for diesel engines because the composites can be regenerated at moderate temperatures with rich pulses, rather than at high temperatures.

2. Related Art

Diesel powered vehicles represent a significant portion of the vehicle market worldwide. In Europe, the market share of diesel passenger cars is about one third and is expected to grow even higher in the years ahead. Compared to gasoline powered vehicles, diesel vehicles offer better fuel economy and engine durability. As diesel passenger cars become more popular both in Europe and elsewhere, emissions reduction is an increasingly urgent issue. In fact, Euro Stage IV regulations (year 2005) are calling for a 50% reduction of NOx emissions (0.25 g/km) compared to the Stage III (year 2000) level (0.5 g/km). For some vehicles, it would be difficult to meet the Euro IV NOx emissions target by engine improvement alone. It may be impossible to meet Euro V NOx regulations (0.125 g/k) without highly efficient after-treatment technologies.

Reducing NOx from diesel exhaust is very challenging. The 3-way catalyst technology, which is widely used in the gasoline cars, is not operational in diesel vehicles. A 3-way catalyst requires the exhaust emissions near a stoichiometric point, neither fuel rich (reducing) nor lean (oxidizing), while diesel emissions are always lean. In the early 90's, the concept of NOx trap catalyst was explored for lean burn gasoline engines where the NOx catalyst would trap NOx in a lean environment and reduce it in a rich environment.

To apply the NOx trap concept to diesel passenger cars, some special issues related to diesel emission characteristics needed to be addressed. The exhaust temperature for light-duty diesel vehicles is typically in the range of 100–400° C., which is much lower than the gasoline exhaust. Therefore, low temperature activity for oxidation and reduction is critical. One of the most difficult challenges in applying this concept is the issue of sulfur poisoning. The exhaust sulfur forms a very strong sulfate on any basic metal site, which prevents the formation of nitrate, rendering the catalyst ineffective for trapping NOx. As with other catalytic converters, thermal stability is another important issue for practical application.

The operation of a NOx trap catalyst is a collection of a series of elementary steps, and these steps are depicted below in Equations 1–5. In general, a NOx trap catalyst should exhibit both oxidation and reduction functions. In an oxidizing environment, NO is oxidized to $NO_2$ (Equation 1), which is an important step for NOx storage. At low temperatures, this reaction is typically catalyzed by precious metals, e.g., Pt. The oxidation process does not stop here. Further oxidation of $NO_2$ to nitrate, with incorporation of an atomic oxygen, is also a catalyzed reaction (Equation 2). There is little nitrate formation in absence of precious metal even when $NO_2$ is used as the NOx source. The precious metal has the dual functions of oxidation and reduction. For its reduction role, Pt first catalyzes the release of NOx upon introduction of a reductant, e.g., CO (carbon monoxide) or HC (hydrocarbon) (Equation 3). This may recover some NOx storage sites but does not contribute to any reduction of NOx species. The released NOx is then further reduced to gaseous $N_2$ in a rich environment (Equations 4 and 5). NOx release can be induced by fuel injection even in a net oxidizing environment. However, the efficient reduction of released NOx by CO requires rich conditions. A temperature surge can also trigger NOx release because base metal nitrate is less stable at higher temperatures. NOx trap catalysis is a cyclic operation. Base metal compounds are believed to undergo a carbonate/nitrate conversion, as a dominant path, during lean/rich operations. The sulfur poisoning of a NOx trap catalyst is depicted below in Equations 6–7. In Equation 6, S occupies a site for NOx and in Equation 7, SOx replaces $CO_3$ or NOx.

Oxidation of NO to $NO_2$ $$NO+1/2O_2 \rightarrow NO_2 \quad (1)$$

NOx Storage as Nitrate $$2NO_2+MCO_1+1/2O_2 \rightarrow M(NO_3)_2+CO_2 \quad (2)$$

NOx Release $$M(NO_3)_2+2CO \rightarrow MCO_{3+NO2}+NO+CO_2 \quad (3)$$

NOx Reduction to $N_2$ $$NO_2+CO \rightarrow NO+CO_2 \quad (4)$$

$$2NO \rightarrow 2CO \rightarrow N_2+2CO_2 \quad (5)$$

SOx Poisoning Process $$SO_2+1/2O_2 \rightarrow SO_3 \quad (6)$$

$$SO_{3+MCO3} \rightarrow MCO_4+CO_2 \quad (7)$$

In Equations 2, 3, and 7, M represents a divalent base metal cation. M can also be a monovalent or trivalent metal compound in which case the equations need to be rebalanced.

A similar cyclic mechanism has been suggested based on thermodynamic calculations, where barium is chemically transformed via a carbonate to nitrate to oxide to carbonate cycle. Analyses of the gaseous products during NOx trapping experiment show that $CO_2$ formation and NOx disappearance is exactly balanced. Since base metal oxides and hydroxides are less stable thermodynamically than their corresponding carbonates and nitrates, it is believed that the prevalent barium species in a waking NOx trap catalyst cycles between carbonate and nitrate. This, however, does not exclude the existence of other species (oxide and hydroxide) in minor quantity.

Comparative investigations on the currently most discussed lean burn DeNOx technologies comprising the continuously operating selectively catalytic reduction (SCR) of V-, Pt-, Ir-technologies as well as the discontinuously operating NOx adsorption technology suggest that the latter technology shows the most promising overall performance in terms of NOx, HC and CO removal in view of the proposed EURO III/IV legislation. The relevant operational parameters of the NOx adsorption technology are discussed (i.e. space velocity, NOx throughput, temperature and oxygen concentration) in order to outline the potential of this technology for vehicle application. Furthermore, it is demonstrated, that particularly (hose NOx storage elements, which have the widest NOx operation window on the temperature axis, unfortunately have the highest affinity for the formation of thermally stable sulfates. Consequently, poisoning by sulfur generally is an inevitable side effect of efficient NOx storage. The sulfur concentration wields decisive influence on the long-term ;activity of the NOx adsorption catalysts and it is shown by a worst case study, that even the use of low-sulfur fuel does not need to prevent the accumulation of sulfur on the NOx adsorption catalyst. The accumulation of sulfur on the catalyst has to be counteracted by an engine induced desulfation strategy, by which the sulfur is driven out of the NOx adsorption catalyst. This requires the provision of reducing exhaust gas at elevated temperature for a short period of time. An optimization of the desulfation parameters is mandatory in order to suppress the formation of $H_2S$. It is conjectured that the thermal degradation of the NOx adsorption catalyst proceeds via two different deactivation modes. The first one is based upon the loss of Pt dispersion and is accelerated by the presence of oxygen while the second one can be traced back to the reaction between NOx storage components and the porous support material. Wolfgang Strehlau et al., Conference "Engine and Environment" 97.

Direct injection technology for diesel engines as well as for gasoline engines are the most favored ways to reduce the $CO_2$ emissions in the future. NOx adsorber technology for gasoline DI engines as well as for HSDI diesel engines is the favored technology to meet future emission limits. Adsorber catalysts have demonstrated their potential to meet future emission legislation levels on prototype basis for gasoline and diesel engines. Improving the NOx adsorber technology and the integration of the adsorber system into the powertrain system for the introduction into the European market is the challenge for the near future.

U.S. Pat. No. 5,407,652 (Swamy et al.) discloses a process for removing $N_2O$ from an $N_2O$ containing gaseous mixture. The process comprises heat treating a catalyst precursor to form a catalyst and reacting the $N_2O$ containing gaseous mixture in the presence of the catalyst under conditions sufficient to convert the $N_2O$ to gaseous nitrogen and gaseous oxygen. The catalyst precursor comprises an anionic clay material represented by the formula, $M_mN_n(OH)_{(2m+2n)}A_a.bH_2O$, wherein M is a divalent metal cation; N is a trivalent metal cation; A is a mono-, di-, or trivalent anion which decomposes when heated to a temperature sufficient to form a volatile gas; m and n are such that m/n has values of 0.5 to about 6; a is a number with the proviso that when A is a monovalent anion, a=n, when A is a divalent anion, a=1/2n and when A is a trivalent anion a=1/3n; and b is an integer having values of 1 to 10. The anionic clay material is heated to a temperature sufficient to cause A, the mono-, di- or trivalent anion, to decompose to form a volatile gas.

U.S. Pat. No. 5,727,385 (Hepburn '385) discloses a catalyst system, located in the exhaust gas passage of a lean-burn internal combustion engine, useful for converting carbon monoxide, nitrogen oxides, and hydrocarbons present in the exhaust gas. The catalyst system comprises two-components: (1) a lean-burn nitrogen oxide catalyst being a transition metal selected from the group consisting of copper, chromium, iron, cobalt, nickel, iridium, cadmium, silver, gold, platinum, manganese, and mixtures thereof loaded on a refractory oxide or exchanged into zeolite; and (2) a nitrogen oxide (NOx) trap material which absorbs NOx when the exhaust gas flowing into the trap material is lean and releases the absorbed NOx when the concentration of oxygen in the inflowing exhaust gas is lowered. The nitrogen oxide trap material is located downstream of the lean-burn nitrogen oxide catalyst in the exhaust gas passage such that the exhaust gases are exposed to the lean-burn catalyst prior to being exposed to the nitrogen oxide trap material.

U.S. Pat. No. 5,750,082 (Hepburn et al. '082) discloses a nitrogen oxide trap useful for trapping nitrogen oxide present in the exhaust gases generated during lean-burn operation of an internal combustion engine. The trap comprises distinct catalyst phases: (a) a porous support loaded with catalyst comprising 0.1 to 5 weight % platinum; and (b) another porous support loaded with 2 to 30 weight % catalyst of an alkaline metal material selected from the group consisting of alkali metal elements and alkaline earth elements.

U.S. Pat. No. 5,753,192 (Dobson et al.) discloses a nitrogen oxide trap useful for trapping nitrogen oxide present in an exhaust gas stream generated during lean-burn operation of an internal combustion engine and releasing the absorbed nitrogen oxides when the oxygen concentration of the exhaust gas is lowered. The trap comprises a porous support loaded with 6–15 wt. % strontium oxide; and loaded thereon together: (a) 0.5–5 wt. % precious metal selected from platinum, palladium, rhodium and mixtures thereof; (b) 3.5–15 wt. % zirconium; and (c) 15–30 wt. % sulfate.

U.S. Pat. No. 5,758,489 (Hepburn et al. '489) discloses a nitrogen oxide trap useful for trapping nitrogen oxide present in the exhaust gases generated during lean burn operation of an internal combustion engine. The trap comprises a porous support; and catalysts comprising at least 10 weight percent lithium and 0.2 to 4 weight percent platinum loaded on the porous support.

U.S. Pat. No. 5,759,553 (Lott et al.) discloses a NOx adsorber material comprising an activated alkali metal-doped and copper-doped hydrous zirconium oxide material that adsorbs NOx in an oxidizing atmosphere and desorbs NOx in a non-oxidizing atmosphere.

U.S. Pat. No. 5,910,097 (Boegner et al.) discloses an exhaust emission control system for an internal combustion engine. The system comprises two adsorber parts arranged in parallel for alternate adsorption and desorption of nitrogen oxides contained in an exhaust from an engine. A means for conducting the exhaust further downstream is provided emerging from one of the two adsorber parts currently operated in the adsorption mode and for recycling the exhaust emerging from the other of the two adsorber parts operating in the desorption mode into an intake line of the engine. An oxidizing converter is located near the engine and upstream from the adsorber parts for oxidation of at least NO contained in the exhaust to $NO_2$. An exhaust line section is located upstream of the adsorbs parts and is divided into a main line branch and a partial line branch parallel to the main fine branch. The two adsorber parts are connected by control valves to the main line branch and the partial line branch such that The one adsorber part that is operating in the adsorption mode is fed by the exhaust stream from the main line branch and the other adsorber part that is operating in the desorption mode is supplied by the exhaust stream from the partial line branch.

European patent applications 589,393A2 discloses a method for purifying an oxygen rich exhaust gas by simultaneously removing the carbon monoxide, hydrocarbons, and nitrogen oxides contained in the exhaust gas. The method comprises bringing the oxygen rich exhaust gas into contact with an exhaust gas purifying catalyst comprised of (i) at least one noble metal selected from the group consisting of platinum and palladium (ii) barium, and (iii) at least one metal selected from the group consisting of alkali metals, iron, nickel, cobalt and magnesium, supported on a carrier composed of a porous substance.

European parent application 669,157A1 discloses a catalyst for purifying exhaust gases. The catalyst comprises a heat resistant support; a porous layer coated on the heat resistant support; a noble metal catalyst ingredient loaded on the porous layer; and an NOx storage component selected from the group consisting of alkaline-earth metals, rare-earth elements and alkali metals, and loaded on the porous layer. The noble metal catalyst ingredient and the NOx storage component are disposed adjacent to each other, and dispersed uniformly in the porous layer.

European patent application 764,459A2 discloses a nitrogen oxide trap useful for trapping nitrogen oxide present in the exhaust gases generated during lean-burn operation of an internal combustion engine. The Imp comprises distinct catalyst phases (a) a first porous support loaded with catalyst comprising 0.1 to 5 weight % platinum; and (b) a second porous support loaded with 2 to 30 weight % catalyst of a material selected from the group consisting of alkali metal elements and alkaline earth elements.

European patent application 764,460A2 discloses a nitrogen oxide trap useful for trapping nitrogen oxide present in the exhaust gases generated during lean-burn operation of an internal combustion engine. The trap comprises a porous support; and catalysts consisting of manganese and potassium loaded on the porous support.

Laboratory and engine tests were carried out to describe the sulfur effect on the NOx adsorbers catalysts efficiency for gasoline lean burn engines. One aspect of the study dealt with the NOx storage efficiency of the adsorber under laboratory conditions, especially regarding the $SO_2$ gas phase concentration. The rate of sulfur storing is greatly affected by the $SO_2$ gas concentration. While 6.5 hours are required to get from 70% NOx reduction to only 35% when the gas mixture contains 10 ppm SOx, it takes 20 hours with 5 ppm of SOx and more than 60 hours with the 2 ppm $SO_2$ condition. The relationship between the loss in NOx trap performance and $SO_2$ concentration appears to have an exponential shape. The same amount of sulfur (0.8% mass) is deposited onto the catalyst within 10 hours with the feed gas containing 10 ppm of $SO_2$ and within 50 hours with 2 ppm SO2. Nevertheless, it was shown that the loss in NOx-trap efficiency is not the same in these two cases. The efficiency decreased from 70% to 25% in the first case (with 10 ppm SO2) and from 70% to only 38% in the second case (with 2 ppm SO2). The second aspect describes a parametric study on engine bench concerning the sulfur effect on NOx trap efficiency and the required conditions (temperature, air/fuel ratio) to obtain different rates of desulfation. For instance, after 70 hours, NOx efficiency decreased from 90% to 25% with a sulfur content in gasoline of 110 ppm. Complete regeneration requires various durations of desulfation depending on air/fuel ratio (gamma=1 to 0.95) and temperature conditions (950 to 750° C.). For example, complete regeneration occurs after several minutes at gamma=1 and several sets of ten seconds at gamma=0.95 at 650° C. Results show that sulfur content close to EURO III gasoline standards is the main obstacle for the introduction of NOx absorber catalyst in Europe. Impact of Sulfur on Nox Trap Catalyst Activity Study of the Regeneration Conditions, M. Guyon et al., Society of Automotive Engineers, 982607 (1998).

The conventional catalysts described above employing $NO_x$ storage components have the disadvantage under practical applications of suffering from long-term activity loss because of $SO_x$ poisoning of the NO traps. The $NO_x$ trap components employed in the catalysts tend to trap $SO_x$ and form very stable sulfates which require regeneration at 650° C. which is not practical for low temperature diesel exhaust. Accordingly, it is a continuing goal to develop NOx trap catalysts which can reversibly trap $SO_x$ present in the gaseous stream and thereby prevent $SO_x$ sulfur oxide poisoning of the $NO_x$ trap and an he regenerated at moderate temperatures with rich pulses, rather than at high temperatures.

SUMMARY OF THE INVENTION

The present invention pertains to a method for removing $NO_x$ and $SO_x$ contaminants from a gaseous stream comprising the steps of:

(1) heat treating a catalyst precursor to form a catalyst composite;

(2) in a sorbing period, passing a lean gaseous stream comprising $NO_x$ and $SO_x$ within a sorbing temperature range through the catalyst composite to sorb at least some of the $SO_x$ contaminants and thereby provide a $SO_x$ depleted gaseous stream exiting the catalyst composite and to sorb and abate at least some of the $NO_x$ contaminants in the gaseous stream and thereby provide a $NO_x$ depleted gaseous stream exiting the catalyst composite;

(3) in a $SO_x$ desorbing period, converting the lean gaseous stream to a rich gaseous stream and raising the temperature of the gaseous stream to within a desorbing temperature range to thereby reduce and desorb at least some of the $SO_x$ contaminants from the catalyst composite and thereby provide a $SO_x$ enriched gaseous stream exiting the catalyst composite; and (4) in a $NO_x$ desorbing period, converting the lean gaseous stream to a rich gaseous stream and raising the temperature of the gaseous stream to within a desorbing temperature range to thereby reduce and desorb at least some of the $NO_x$ contaminants from the catalyst composite and thereby provide a $NO_x$ enriched gaseous stream exiting the catalyst composite;

wherein the catalyst precursor comprises:

(a) a platinum component;

(b) a support;

(c) a NOx sorbent component; and (d) a spinet material prepared by calcining an anionic clay material represented by the formula $M_mN_n(OH)_{(2m+2n)}A_a.bH_2O$, wherein M is a divalent metal cation; N is a trivalent metal cation; A is a mono-, di-, or trivalent anion which decomposes when heated to a temperature sufficient to form a volatile gas; m and n are such that m/n has values from about 0.5 to about 6; a is a number with the proviso that when A is a monovalent anion, a=n, when A is a divalent anion, a=1/2n, and when A is a trivalent anion, a=1/3n; and b is an integer having a value from 1 to about 10.

The present invention also pertains to a method of forming a catalyst composite which comprises forming an admixture of:

(a) a platinum component;

(b) a support;

(e) a NOx sorbent component; and (d) a spinal material prepared by calcining an anionic clay material represented by the formula $M_mN_n(OH)_{(2m+2n)}A_a.bH_2O$, wherein the formula is as defined above.

The present invention also pertains to a method of forming a catalyst composite which comprises the steps of:

(1) forming an admixture of:

(a) a support;

(b) a NOx sorbent component; and (c) a spinal material;

(2) combining a water-soluble or dispersible platinum component and the admixture from step (1) with an aqueous liquid to form a solution or dispersion which is sufficiently dry to absorb essentially all of the liquid;

(3) forming a layer of the solution or dispersion on a substrate; and (4) converting the platinum component in the resulting layer to a waterinsoluble form;

wherein the spinal material is prepared by calcining an anionic clay material represented by the formula $M_mN_n(OH)_{(2m+2n)}A_a.bH_2O$, wherein the formula is as defined above.

The present invention also pertains to a catalyst composite comprising:

(a) a platinum component;

(b) a support;

(c) a NOx sorbent component; and (d) a spinal material prepared by calcining an anionic clay material represented by the formula $M_mN_n(OH)_{(2m+2n)}A_a.bH_2O$, wherein the formula is as defined above.

The sulfur tolerant NOx trap catalyst composites are highly effective with a sulfur containing fuel by trapping sulfur oxide contaminants which tend to poison conventional NOx trap catalysts used to abate other pollutants in the stream. The sulfur tolerant NOx trap catalyst composites are suitable for diesel engines because the composites can be regenerated at moderate temperatures with rich pulses, rather than at high temperatures.

BRIEF DESCRIPTION OF THE FIGURES

FIG. 1 is a graph showing a comparison of the dynamic $NO_x$ conversions of Samples A to G as a function of temperature. The NOx removal efficiency for Samples A to E is much higher than that of Samples F and G at and below 300° C.

FIG. 2 is a graph showing a sulfur tolerance test of Sample A at a constant temperature (T=250° C.) as a function of time. The $NO_x$ conversion decreases continuously with time in a $SO_2$ containing stream due to sulfur poisoning. At the end of the 6 hours run, the catalyst was regenerated at 550° C. with 3% CO for 10 minutes, and the test was repeated for another 6 hours. The $NO_x$ conversion efficiency was completely recovered after the regeneration treatment at 550° C.

FIG. 3 is a graph showing a sulfur tolerance test of Sample B at a constant temperature (T=250° C.) as a function of time. The NOx efficiency decreases with run time at 250° C. due to $SO_2$ poisoning but with a relatively slower rate compared to Sample A. Upon desulfation treatment, the $NO_x$ efficiency of Sample B was completely recovered.

FIG. 4 is a graph showing a sulfur tolerance test of Sample D at a constant temperature (T=250° C.) as a function of time. Like Samples A and B, the NOx efficiency for Sample D is completely recovered after a regeneration at 550° C. to remove the deposited sulfur during the run.

FIG. 5 is a graph showing a sulfur tolerance test of Sample E at a constant temperature (T=250° C.) as a function of time. Like Samples A and B, the NOx efficiency for Sample E is completely recovered after a regeneration at 550° C. to remove the, deposited sulfur during the run.

FIG. 6 is a graph showing a sulfur tolerance test of Sample F at a constant temperature (T=250° C.) as a function of time. The $NO_x$ conversion quickly drops to 35% from its initial level of 82% in 6 hours run in the sulfur containing feed. However, after a desulfation treatment at 550° C., its activity only slightly recovered.

DETAILED DESCRIPTION OF THE INVENTION AND SPECIFIC EMBODIMENTS THEREOF

The present invention relates to sulfur tolerant catalyst composites useful for reducing contaminants in exhaust gas streams, especially gaseous streams containing sulfur oxide contaminants. More specifically, the present invention is concerned with improved NOx trap catalysts for use in diesel engines as well as lean burn gasoline engines. The sulfur tolerant NOx trap catalyst composites comprise a platinum component, a support, a NOx sorbent component, and a spinel material prepared by calcining an anionic clay material. The sulfur tolerant NOx trap catalyst composites are highly effective with a sulfur containing fuel by trapping sulfur oxide contaminants which tend to poison conventional NOx trap catalysts used to abate other pollutants in the stream. The sulfur tolerant NOx trap catalyst composites are suitable for diesel engines because the composites can be regenerated at moderate temperatures with rich pulses, rather than at high temperatures. Conventional NOx trap catalysts are readily poisoned by sulfur and cannot be regenerated by rich pulses below 650° C. Since the exhaust temperature of diesel engines is low, the temperature requirement of 650° C. for regeneration and higher is not practical. The sulfur tolerant NOx trap catalyst composites of the present invention can be regenerated with rich pulses at moderate temperatures (550° C.).

A catalyst adsorbs or traps NOx when the exhaust gas is lean and releases the stored NOx when the exhaust stream is rich. The released NOx is subsequently reduced to $N_2$ over the same catalyst. The rich environment in a diesel engine is normally realized with a rich pulse generated by either engine management or injection of reducing agents (such as fuel, or a CO or $CO/H_2$ mixture) into the exhaust pipe. The timing and frequency of the rich pulse is determined by the NOx level emitted from the engine, the richness of the exhaust, on the concentration of the reductant in the rich pulse and the NOx conversion desired. Normally, the longer the lean period, the longer the rich pulse is needed. The need for longer rich pulse timing may be compensated by higher concentration of the reductant in the pulse. Overall, the quantity of the NOx trapped by the NOx trap should be balanced by the quantity of the reductant in the rich pulse. The lean NOx trapping and rich NOx trap regeneration are operative at normal diesel operating temperatures (150–450° C.). Beyond this temperature window, the efficiency of the NOx trap catalyst becomes less effective. In a sulfur containing exhaust stream, the catalyst becomes deactivated over time due to sulfur poisoning. To regenerate the sulfur-poisoned NOx trap, a rich pulse (or pulses) needs to be applied at temperatures higher than the normal diesel operating temperature. The regeneration time of the generation depends on the sulfur level in the exhaust (or fuel sulfur level) and the length of the catalyst had exposed to the sulfur-containing stream. The quantity of the reductant added during the desulfation should counterbalance the total amount of sulfur trapped in the catalyst. Engine operability will determine whether a single long pulse or multiple short pulses are employed.

As used herein, the following terms, whether used in singular or plural form, have the meaning defined below.

The term "catalytic metal component", or "platinum metal component", or reference to a metal or metals comprising the same, means a catalytically effective form of the metal or metals, whether the metal or metals are present in elemental form, or as an alloy or a compound, e.g., an oxide.

The term "component" or "components" as applied to $NO_x$ sorbents means any effective $NO_x$-trapping forms of the metals, e.g., oxygenated metal compounds such as metal hydroxides, mixed metal oxides, metal oxides or metal carbonates.

The term "dispersed", when applied to a component dispersed onto a bulk support material, means immersing the bulk support material into a solution or other liquid suspension of the component or a precursor thereof. For example, the sorbent strontium oxide may be dispersed onto an alumina support material by soaking bulk alumina in a solution of strontium nitrate (a precursor of strontia), drying the soaked alumina particles, and heating the particles, e.g., in air at a temperature from about 450° C. to about 750° C. (calcining) to convert the strontium nitrate to strontium oxide dispersed on the alumina support materials.

The term "gaseous stream" or "exhaust gas stream" means a stream of gaseous constituents, such as the exhaust of an internal combustion engine, which may contain entrained non-gaseous components such as liquid droplets, solid particulates, and the like.

The terms "$g/in^3$" or "$g/ft^3$" or "$g/ft^3$" used to describe weight per volume units describe the weight of a component per volume of catalyst or trap member including the volume attributed to void spaces such as gas-flow passages.

The term "lean" mode or operation of treatment means that the gaseous stream being treated contains more oxygen that the stoichiometric amount of oxygen needed to oxidize the entire reductants content, e.g., HC, CO and $H_2$, of the gaseous stream.

The term "mixed metal oxide" means bimetallic or multimetallic oxygen compounds, such as $Ba_2SrWO_6$, which are true compounds and is not intended to embrace more mixtures of two or more individual metal oxides such as a mixture of SrO and BaO.

The term "platinum group metals" means platinum, rhodium, palladium, ruthenium, iridium, and osmium.

The term "sorb" means to effect sorption.

The term "stoichiometric/rich" mode or operation of treatment means that the gaseous stream being treated refers collectively to the stoichiometric and rich operating conditions of the gas stream.

The abbreviation "TOS" means time on stream.

The term "washcoat" has its usual meaning in the art of a thin, adherent coating of a catalytic or other material applied to a refractory carrier material, such as a honeycomb-type carrier member, which is sufficiently porous to permit the passage therethrough of the gas stream being treated.

The abbreviation "HT" stands for hydrotalcite.

In accord with the present invention, a catalyst composite is provided comprising (a) a platinum component; (b) a support; (c) a NOx sorbent component; and (d) a spinel material prepared by calcining an anionic clay material represented by the formula $M_mN_n(OH)_{(2m+2n)}A_a.bH_2O$, wherein M is a divalent metal cation; N is a trivalent metal cation; A is a mono-, di-, or trivalent anion which decomposes when healed to a temperature sufficient to form a volatile gas; m and n are such that m/n has values from about 0.5 to about 6; a is a number with the proviso that when A is a monovalent anion, a×n, when A is a divalent anion, a=1/2n, and when A is a trivalent anion, a=1/3n; and b is an integer having a value from 1 to about 10.

As set out above, the sulfur tolerant catalyst composite of the present invention includes a platinum component, and optionally a platinum group metal component other than platinum. The optional platinum group metal component other than platinum may be selected from the group consisting of palladium, rhodium, ruthenium, iridium, and osmium components. The preferred platinum group metal component other than platinum is selected from the group consisting of palladium, rhodium, and mixtures thereof.

The sulfur tolerant catalyst composite of the present invention also includes a support made of a high surface area refractory oxide support. The support may be selected from the group consisting of alumina, silica, titania, and zirconia compounds. Useful high surface area supports include one or more refractory oxides. These oxides include, for example, silica and metal oxides such as alumina, including mixed oxide forms such as silica-alumina, aluminosilicates which may be amorphous or crystalline, alumina-ziroconia, alumina-chromia, alumina-ceria and the like. Preferably the support is an activated compound selected from the group consisting of alumina, silica, silica-alumina, aluminosilicates, alumina-zirconia, alumina-chromia, and alumina-ceria. More preferably, the support is activated alumina. In one embodiment, the support is substantially comprised of alumina which preferably includes the members of the gamma or activated alumina family, such as gamma and era aluminas, and, if present, a mirror amount of other refractory oxide, e.g., about up to 20 weight percent. Desirably, the active alumina has a specific surface area of 60 to 300 $m^2/g$.

The sulfur tolerant catalyst composite of the present invention also includes a $NO_x$ sorbent component. Preferably, the $NO_x$ sorbent component is selected from the group consisting of alkaline earth metal components, alkali metal components, and rare earth metal components. More preferably, the $NO_x$ sorbent component is selected from the group consisting of oxides of calcium, strontium, and barium, oxides of potassium, sodium, lithium, and cesium, and oxides of cerium, lanthanum, praseodymium, and neodymium. In one embodiment, the $NO_x$ sorbent component is selected from the group consisting of oxides of calcium, strontium, and barium. In another embodiment, the $NO_x$ sorbent component is selected from the group consisting of oxides of potassium, sodium, lithium, and cesium. In another embodiment, the $NO_x$ sorbent component is selected from the group consisting of oxides of cerium, lanthanum, praseodymium, and neodymium. In another embodiment, the $NO_x$ sorbent component is at least one alkaline earth metal component and at least one rare earth metal component selected from the group consisting of lanthanum and neodymium.

The sulfur tolerant catalyst composites of the present invention also include a spinet material, prepared by calcining an anionic clay material, that provides superior catalytic activity and life under typical process conditions. Moreover, the process can be operated at lower temperatures than processes using other catalysts and the catalysts used in the process exhibit extended catalyst lift. The spinet material is formed by heat treating or calcining one or more anionic clay materials represented by the formula $M_mN_n(OH)_{(2m+2n)}A_a.bH_2O$. In the formula, M is a divalent metal cation; N is a trivalent metal cation; A is a mono-, di-, or trivalent anion which decomposes when heated to a temperature sufficient to form a volatile gas; m and n are such that m/n has values from about 0.5 to about 6; a is a number with the proviso that when A is a monovalent anion, a=n, when A is a divalent anion, a=1/2n, and when A is a trivalent anion, a=1/3n; and b is an integer having a value from 1 to about 10.

The anionic clay materials recited in the above-mentioned formula include, but are not limited to materials commonly referred to as hydrotalcites (HT), siogrenites and pyroaurites which compositions are well defined and can be prepared according to methods known in the art. The temperature required to decompose the mono-, di- or trivalent anion, A, to form a volatile gas will vary depending upon the particular anionic clay material and such temperatures can be readily determined by one of ordinary skill in the art without undue experimentation. Typical decomposition temperatures range from about 200° to 800° C. The decomposition temperature is not critical to the practicing the invention.

The preferred ratio of m to n according to the formula can be varied from 1 to 4 according to conventional techniques known in the art. M can be any divalent cation. Suitable divalent cations include $Co^{2+}$, $Cu^{2+}$, $Ni^{2+}$, $Pd^{2+}$, $Ze^{2+}$, $Fe^{2+}$, $Mn^{2+}$, $Mg^{2+}$, and mixtures thereof. Suitable trivalent cations include $Al^{3+}$, $Ga^{3+}$, $In^{3+}$, $Fc^{3+}$, $Rh^{3+}$, $Co^{3+}$, $B^{3+}$, $Cr^{3+}$, $La^{3+}$, $Sc^{3+}$, $Y^{3+}$ and the rare earth metals including $Ce^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, and mixtures thereof.

Since each trivalent cation has one more positive charge than the divalent cation, the sheets gain one unit of positive charge per each trivalent ion which charge is compensated by suitable anions such as $CO_3^{2-}$ which are located interstitially. Water molecules may be situated between each metal ion sheet. The preferred ratio of M to Al (when N=Al) can he varied from 1.5 to 4 according to conventional techniques known in the art.

Suitable divalent cations include $Co^{2+}$, $Cu^{2+}$, $Ni^{2+}$, $Pd^{2+}$, $Zn^{2+}$, $Fe^{2+}$, $Me^{2+}$, $Mg^{2+}$, and mixtures thereof. Suitable trivalent cations include $Al^{3+}$, $Ga^{3+}$, $In^{3+}$, $Fe^{3+}$, $Rh^{3+}$, $Co^{3+}$, $B^{3+}$, $Cr^{3+}$, $La^{3+}$, $Sc^{3+}$, $Y^{3+}$ and the rare earth metals including $Co^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, and mixtures thereof. Preferred divalent cations include $Co^{2+}$, $Ni^{2+}$, $Cu^{2+}$, $Pd^{2+}$, $Zn^{2+}$, and $Fe^{2+}$ and referred trivalent cations include $Al^{3+}$, $Ga^{3+}$, $Fe^{3+}$, $Rh^{3+}$, $Co^{3+}$ and $La^{3+}$. Such divalent or trivalent cations can be incorporated into the anionic clay materials by the methods described herein to form particularly active catalysts.

A portion of the divalent ion enumerated in the formula, such as $Mg^{2+}$ in Mg-Al-HT, can be completely or partially replaced by other divalent cations such as copper, cobalt, zinc, iron, nickel, or palladium.

A in the anionic clay material of the present invention may be selected from the group consisting of $OH^-$, $F^-$, $Cl^-$, $Br^-$, $I^-$, $NO_3^{2-}$, $CO_3^{2-}$, and $SO_4^{2-}$.

The active catalysts of the present invention are derived from layered mixed metal hydroxides having a divalent ion which is partially substituted by trivalent ions whose excess positive charge is compensated by anions occupying the interlayer positions. Techniques capable of preparing the anionic clay materials of the general and preferred embodiments are available in the public domain. For example, suitable methods include the synthetic techniques described by S. Miyata and coworkers, Nippon Kagaku Zasshi 92 (1971) 514; ion exchange techniques described by S. Miyata and coworkers, Clays Clay Miner. 31 (1983) 305; and techniques involving neutralization of the respective carbonates described by D. L. Bish, Bull. Mineral 103 (1980) 170.

For example, Reichle (Solid States Ionics 22 (1986) 135) teaches several methods for preparing anionic clay materials suitable for practicing the enumerated process. A general method for preparing such materials involves mixing a concentrated aqueous solution of the desired cationic metal sources (represented by $M^{2+}$ and $M^{3+}$ in the formula) with an aqueous hydroxide/carbonate solution to yield an amorphous gel which is thermally aged at a temperature between 60° to 325° C. to provide an active catalyst for processes other than $N_2O$ decomposition.

Alternately, the anionic clay materials of the present invention can be prepared by conventional methods proposed by Reichle and coworkers (J. Catal., 94 (1985) 547) wherein desired metal nitrates are sequentially precipitated using a $NaOH/Na_2CO_3$ mixture. The resultant precipitate is aged at 65° C. for 24 hours and is filtered, washed with distilled water and dried overnight at 70° C. to provide the desired anionic clay powder.

An alternate method for preparing the enumerated anionic clay materials, in general, and HT, in particular, comprises adding a solution of mixed magnesium/aluminum nitrates, sulfates or chlorides to a stoichiometric solution of sodium hydroxide and sodium carbonate at about 25° to 35° C., while stirring vigorously over a period of several hours to form a slurry. The slurry is heated to about 50° to 200° C. for 1 to 18 hours (preferably 60°–75° C.) in order to promote crystallization. A practical mixing temperature ranges from about 65°–75° C. which yields a crystal of about 150–300 angstrom in size having a surface area of 100–120 $m^2/g$ ($BET/N_2$ technique). The resulting solids are recovered by filtering followed by washing and drying.

The rate at which the metal ions are added to the aqueous caustic/carbonate solution is not critical to preparing the materials not is the reaction temperature. The rate of addition can also be varied widely. However, the solutions must be effectively agitated in order to preclude undesired reactions from taking place. The addition temperature is normally maintained at or about room temperature. The resulting gel material is aged at elevated temperatures, normally less than 100° C., to form the hydrotalcite crystallite.

The resulting anionic clay materials represented by the formula are heat treated at a temperature between about 150° and 850°, preferably between 225° and 800° C., and more preferably between 300° and 700° C., in air, an inert gas stream, in vacuum. The heat treatment temperature used to convert the anionic clay material to the active catalyst can be varied widely. At temperatures less than about 200° C., the desired mixed metal oxides are formed slowly and incompletely. The heat treatment temperature should be selected to provide control to the extent to which the anionic clay material is converted to active catalyst while maintaining acceptable surface area.

Preferred temperatures for heat treating a given anionic clay material according to the present invention can be readily determined without undue experimentation. Non-stoichiometric, well dispersed mixed metal oxides are formed upon heat treating the enumerated anionic clay materials within the specified temperature ranges. The heat treatment causes the mono-, di- and trivalent anions represented by "A" in the formula to decompose to a volatile gas thereby forming the active catalyst.

Anionic clays, hydrotalcites, and layered double hydroxides are described in detail in Infrared emission spectroscopic study of the thermal transformation of Mg-, Ni- and Co-hydrotalcite catalysts, J. Theo Kloprogge and Ray L. Frost, Applied Catalysis A: General 184 61–71 (1999), which disclosure is incorporated herein by reference.

The fine catalyst powders obtained according to these methods can be supported on conventional inorganic supports such as clays, alumina, silica, silica/alumina, titania, zeolites or cordierite. The powders can be formed into pellets or extruded to form particles which are wear and impact resistant and can function effectively in fixed-bed reactors. Conventional binders and other additives can be added to the catalyst to aid in the forming process.

In use, the exhaust gas stream, comprising hydrocarbons, carbon monoxide, nitrogen oxides, and sulfur oxides and which is contacted with the catalyst composite of the present invention, is alternately adjusted between lean and stoichiometric/rich operating conditions so as to provide alternating lean operating periods and stoichiometric/rich operating periods. The exhaust gas stream being treated may be selectively rendered lean or stoichiometric/rich either by adjusting the air-to-fuel ratio fed to the engine generating the exhaust or by periodically injecting a reductant into the gas stream upstream of the catalyst. For example, the catalyst composite of the present invention is well suited to treat the exhaust of engines, especially diesel engines, which continuously run lean. In a diesel engine, in order to establish a stoichiometric/rich operating period, a suitable reductant, such as fuel, may be periodically sprayed into the exhaust immediately upstream of the catalytic trap of the present invention to provide at least local (at the catalytic trap) stoichiometric/rich conditions at selected intervals. Partial lean-burn engines, such as partial lean-burn gasoline engines, are designed with controls which cause them to operate lean with brief, intermittent rich or stoichiometric conditions. In practice, the sulfur tolerant NOx trap catalyst composite absorbs in-coming $SO_x$ during a lean mode operation (100° C. to 500° C.) and desorbs $SO_x$ (regenerate) during a rich mode operation (greater than about 500° C., preferably greater than about 600° C., more preferably from about 600° C. to about 1100° C., and most preferably from about 625° C. to about 750° C.). When the exhaust gas temperature returns to a lean mode operation (100° C. to 500° C.), the regenerated sulfur tolerant NOx trap catalyst composite can again selectively absorb incoming $SO_x$. The duration of the lean mode may be controlled so that the sulfur tolerant NOx trap catalyst composite will not be saturated with $SO_x$.

When the composition is applied as a thin coating to a monolithic carrier substrate, the proportions of ingredients are conventionally expressed as grams of material per cubic inch (g/in$^3$) of the catalyst and the substrate. This measure accommodates different gas flow passage cell sizes in different monolithic carrier substrates. Platinum group metal components are based on the weight of the platinum group metal.

A useful and preferred sulfur tolerant Nor trap catalyst composite has at least about 1 g/ft$^3$ of a platinum component; from about 0.15 g/in$^3$ to about 4.0 g/in$^3$ of a support; at least about 1 g/ft$^3$ of a platinum group metal component other than platinum; (iv) from about 0.025 g/in$^3$ to about 1 g/in$^3$ of a $NO_x$ sorbent component selected from the group consisting of alkaline earth metal oxides, alkali metal oxides, and rare earth metal oxides; from about 0.01 g/in$^3$ to about 2 g/in$^3$ of the anionic clay material; from about 0.025 g/in$^3$ to about 0.5 g/in$^3$ of a first zirconium component; and from 0.0 and preferably about 0.025 g/in$^3$ to about 0.5 g/in$^3$ of at least one first rare earth metal component selected from the group consisting of ceria metal components, lanthanum metal components and neodymium metal component.

The specific construction of the catalyst composite set out above results in an effective catalyst that reversibly traps sulfur oxide contaminants present and thereby prevents the sulfur oxide contaminants from poisoning the NOx trap catalysts for use in diesel engines. The catalyst composite can be in the form of a self-supported article such as a pellet, and more preferably, the sulfur tolerant NOx trap catalyst composite is supported on a carrier, also referred to as a substrate, preferably a honeycomb substrate. A typical so-called honeycomb-type carrier member comprises a "brick" of material such as cordierite or the like, having a plurality of fine, gas-flow passages extending from the front portion to the rear portion of the carrier member. These fine gas-flow passages, which may number from about 100 to 900 passages or cells per square inch of face area ("cpsi"), have a catalytic trap material coated on the walls thereof.

The present invention also includes a method for treating an exhaust gas stream which comprises the step of contacting the gas stream comprising carbon monoxide and/or hydrocarbons, nitrogen oxides, and sulfur oxides with the catalyst composite set out above. The present invention also includes a method of treating an exhaust gas stream comprising the steps of contacting the stream with the catalyst composite set out above under alternating periods of lean and stoichiometric or rich operation. Contacting is carried out under conditions whereby at least some of the $SO_x$ in the exhaust gas stream is trapped in the catalytic material during the periods of lean operation and is released and reduced during the periods of stoichiometric or rich operation.

In a specific embodiment, the present invention pertains to a method for removing $NO_x$ and $SO_x$ contaminants from a gaseous stream comprising the steps of:

(1) heat treating a catalyst precursor to form a catalyst composite;

(2) in a sorbing period, passing a lean gaseous stream comprising $NO_x$ and $SO_x$ within a sorbing temperature range through the catalyst composite to sorb at least some of the $SO_x$ contaminants and thereby provide a $SO_x$ depleted gaseous stream exiting the catalyst composite and to sorb and abate at least some of the $NO_x$ contaminants in the gaseous stream and thereby provide a $NO_x$ depleted gaseous stream exiting the catalyst composite;

(3) in a $SO_x$ desorbing period, converting the lean gaseous stream to a rich gaseous stream and raising the temperature of the gaseous stream to within a desorbing temperature range to thereby reduce and desorb at least some of the $SO_x$ contaminants from the catalyst composite and thereby provide a $SO_x$ enriched gaseous stream exiting the catalyst composite; and (4) in a $NO_x$ desorbing period, converting the lean gaseous stream to a rich gaseous stream and raising the temperature of the gaseous stream to within a desorbing temperature range to thereby reduce and desorb at least some of the $NO_x$ contaminants from the catalyst composite and thereby provide a $NO_x$ enriched gaseous stream exiting the catalyst composite;

wherein the catalyst precursor comprises:

(a) a platinum component;

(b) a support;

(c) a NOx sorbent component; and (d) a spinet material prepared by calcining an anionic clay material represented by the formula $M_mN_n(OH)_{(2m+2n)}A_a.bH_2O$ wherein M is a divalent metal cation; N is a trivalent metal cation; A is a mono-, di-, or trivalent anion which decomposes when heated to a temperature sufficient to form a volatile gas; m and n are such that m/n has values from about 0.5 to about 6; a is a number with the proviso that when A is a monovalent anion, a=n, when A is a divalent anion, a=1/2n, and when A is a trivalent anion, a=1/3n; and b is an integer having a value from 1 to about 10.

The present invention also includes a method for preparing the catalyst composite of the present invention. The method involves forming a catalyst composite which comprises forming an admixture of (a) a platinum component; (b) a support; (c) a NOx sorbent component; and (d) an anionic clay material of the present invention.

In a specific embodiment, the present invention pertains to a method of forming a catalyst composite which comprises the steps of:

(1) forming an admixture of:

(a) a support;

(b) a NOx sorbent component; and (c) a spinet material;

(2) combining a water-soluble or dispersible platinum component and the admixture from step (1) with an aqueous liquid to form a solution or dispersion which is sufficiently dry to absorb essentially all of the liquid;

(3) forming a layer of the solution or dispersion on a substrate; and (4) converting the platinum component in the resulting layer to a waterinsoluble form;

wherein the spinet material is prepared by calcining an anionic clay material represented by the formula $M_mN_n(OH)_{(2m+2n)}A_a.bH_2O$, wherein M is a divalent metal cation; N is a trivalent metal cation; A is a mono-, di-, or trivalent anion which decomposes when heated to a temperature sufficient to form a volatile gas; m and n are such that m/n has values from about 0.5 to about 6; a is a number with the proviso that when A is a monovalent anion, a=n, when A is a divalent anion, a=1/2n, and when A is a trivalent anion, a=1/3n; and b is an integer having a value from 1 to about 10.

The sulfur tolerant catalyst composite may optionally comprise conventional components known in the art.

The sulfur tolerant NOx trap catalyst composite may optionally comprise alkaline earth metals which are believed to stabilize the composition. The alkaline earth metal may be selected from the group consisting of magnesium, barium, calcium and strontium, preferably strontium and barium. Most preferably, the alkaline earth metal component comprises barium oxide or strontium oxide. Stabilization means that the conversion efficiency of the catalyst composition of each layer is maintained for longer period of time at elevated temperatures. Stabilized supports such as alumina and catalytic components such as Noble metals are more resistant to degradation against high temperature exposure thereby maintaining better overall conversion efficiencies. It is known from U.S. Pat. No. 4,727,052 that support materials, such as activated alumina, can be thermally stabilized to retard undesirable alumina phase transformations from gamma to alpha at elevated temperatures by the use of stabilizers or a combination of stabilizers. The alkaline earth metal can be applied in a soluble form which upon calcining becomes the oxide. It is preferred that the soluble barium be provided as barium nitrate, barium acetate or barium hydroxide and the soluble strontium provided as strontium nitrate or strontium acetate, all of which upon calcining become the oxides.

The sulfur tolerant catalyst composite of the present invention can be made by any suitable method. A preferred method comprises forming a mixture of a solution of at least one water-soluble or dispersible, platinum component and a finely-divided, high surface area, refractory oxide which is sufficiently dry to absorb essentially all of the solution. The platinum group metal component other than platinum, when used, can be supported on the same or different refractory oxide particles as the platinum component. The supported platinum and other components are then added to water and preferably comminuted to form the first coal (layer) slurry. The supported platinum group component other than platinum may be comminuted with the supported platinum component, or separately and combined with the other components to form the coat slurry. In particularly preferred embodiments, the coat slurry is comminuted to result in substantially all of the solids having particle sizes of less than 10 micrometers in average diameter. The coat slurry can be formed into a layer and dried. The platinum component and optional platinum group metal component other than platinums in the resulting mixture in the layer are converted to a water-insoluble form chemically or by calcining. The layer is preferably calcined, preferably at a temperature of at least 250° C. Alternatively, the sulfur tolerant catalyst composite of the present composite can also be prepared by the method disclosed in U.S. Pat. No. 4,134,860 (incorporated by reference).

In order to deposit the coat slurries on a macrosized carrier, one or more comminuted slurries are applied to the carrier in any desired manner. Thus the carrier may be dipped one or more times in the slurry, with intermediate drying if desired, until the appropriate amount of slurry is on the carrier. The slurry employed in depositing the catalytically-promoting metal component-high area support composite on the carrier will often contain about 20% to 60% by weight of finely-divided solids, preferably about 25% to 55% by weight.

The sulfur tolerant catalyst composite of the present invention can be prepared and applied to a suitable substrate, preferably a metal or ceramic honeycomb carrier, or may be self-compressed. The comminuted catalytically-promoting metal component-high surface area support composite can be deposited on the carrier in a desired amount, for example, the composite may comprise about 2% to 40% by weight of the coated carrier, and is preferably about 5% to 30% by weight for a typical ceramic honeycomb structure. The composite deposited on the carrier is generally formed as a coating over most, if not all, of the surfaces of the carrier contacted. The combined structure may be dried and calcined, preferably at a temperature of at least about 250° C. but not so high as to unduly destroy the high area of the refractory oxide support, unless such is desired in a given situation.

The carriers useful for the catalysts made by this invention may be metallic in nature and be composed of one or more metals or metal alloys. The metallic carriers may be in various shapes such as corrugated sheet or in monolithic form. Preferred metallic supports include the heat-resistant, base-metal alloys, especially those in which iron is a substantial or major component. Such alloys may contain one or more of nickel, chromium, and aluminum, and the total of these metals may advantageously comprise at least about 15% by weight of the alloy, for instance, about 10% to 25% by weight of chromium, about 3% to 8% by weight of aluminum and up to abort 20% by weight of nickel, say at least about 1% by weight of nickel, if any or more than a trace amount be present. The preferred alloys may contain small or trace amounts of one or more other metals such as manganese, copper, vanadium, titanium and the like. The surfaces of the metal carriers may be oxidized at quite elevated temperatures, e.g. at least about 1000° C., to improve the corrosion resistance of the alloy by forming an oxide layer on the surface of carrier which is greater in thickness and of higher surface area than that resulting from ambient temperature oxidation. The provision of the oxidized or extended surface on the alloy carrier by high temperature oxidation may enhance the adherence of the refractory oxide support and catalytically-promoting metal components to the carrier.

Any suitable carrier may be employed, such as a monolithic carrier of the type having a plurality of fine, parallel gas flow passages extending therethrough from an inlet or an outlet face of the carrier, so that the passages are open to fluid flow therethrough. The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures may contain from about 60 to about 600 or more gas inlet openings ("cells") per square inch of cross section. The ceramic carrier may be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb may be made of a refractory metal such as a stainless steel or other suitable iron based corrosion resistant alloys.

The substrate can comprise a monolithic honeycomb comprising a plurality of parallel channels extending from the inlet to the outlet. The monolith can be selected from the group of ceramic monoliths and metallic monoliths. The honeycomb can be selected from the group comprising flow through monoliths and wall flow monoliths. Such monolithic carriers may contain up to about 700 or more flow channels ("cells") per square inch of cross section, although far fewer may be used. For example, the carrier may have from about 60 to 600, more usually from about 200 to 400, cells per square inch ("cpsi"). The sulfur tolerant catalyst composite can be coated in layers on a monolithic substrate generally which can comprise from about 0.50 g/in$^3$ to about 6.0 g/in$^3$, preferably about 1.0 g/in$^3$ to about 5.0 g/in$^3$ of catalytic composition based on grams of composition per volume of the monolith.

The present invention includes a method comprising passing an inlet end fluid comprising an inlet end coating composition into a substrate as recited above. For the purpose of the present invention a fluid includes liquids, slurries, solutions, suspensions and the like. The aqueous liquid passes into the channel inlets and extending for at least part of the length from the inlet end toward the outlet end to form an inlet end layer coating, with at least one inlet end coating extending for only part of the length from the inlet end toward the outlet end. A vacuum is applied to the outlet end while forcing a gas stream through the channels from the inlet end after the formation of each inlet end coating without significantly changing the length of each inlet layer coating. At least one outlet end aqueous fluid comprising at least one outlet end coating composition is passed into the substrate through the at least some of the channel outlets at the substrate outlet end. The aqueous liquid passes into the channels and extending for at least part of the length from the outlet end toward the inlet end to form at least one outlet end layer coating. The method can further comprise applying a vacuum to the inlet end while forcing a gas stream through the channels from the outlet end after the formation of each outlet end coating without significantly changing the length of each outlet layer coating.

The method can further comprise the step of fixing the precious metal component selected from the inlet precious metal component of the inlet layer and the outlet precious metal component of the outlet layer to the respective inlet or outlet component selected from the inlet refractory oxide and inlet rare earth metal oxide components and the outlet refractory oxide and outlet rare earth metal oxide components. The fixing can be conducted prior to coating the inlet and outlet layers. The step of fixing, can comprise chemically fixing the precious metal component on the respective refractory oxide and/or rare earth metal oxide. Alternatively, the step of fixing can comprise thermally treating the precious metal component on the respective refractory oxide and/or rare earth metal oxide. The step of fixing comprises calcining the precious metal component on the respective refractory oxide and/or rare earth metal oxide. The step of calcining can be conducted at from 200° C., preferably 250° C. to 900° C. at from 0.1 to 10 hours. The steps of thermally fixing each layer are preferably conducted after coating and prior to coating a subsequent layer. The step of thermally treating the substrate upon completion of coating all layers at from 200° C. to 400° C. at from 1 to 10 seconds. The steps of cacining is preferably the substrate conducted upon completion of coating all layers. The step of calcining is conducted at from 250° C. to 900° C. at from 0.1 to 10 hours.

Preferably, the precious metal can be prefixed on the supports. Alternatively the method further comprises fixing the soluble components in the layer such as one precious metal component to one of the refractory oxide or rare earth metal oxide components, the fixing being conducted prior to coating The layers. The step of fixing an comprise chemically fixing the precious metal on the respective refractory oxide and/or rare earth metal oxide. More preferably, the step of fixing comprises thermally treating the precious metal on the refractory oxide and/or rare earth metal oxide. The step of thermally treating the substrate upon completion of coating one or more layers at from 200° C. to 400° C. at from 1 to 10, and preferably 2 to 6 seconds. The heat is provided by forcing a gas stream, preferably air which is heated to from 200° C. to 400° C. This temperature range has been found to substantially fix the soluble components such as precious metal components. The combination of flow rate and temperature of the gas stream should be sufficient to heat the coating layer and preferably, providing a minimum of heat to the underlying substrate to enable rapid cooling in the subsequent cooling step prior to application of subsequent layers. Preferably, the steps of thermally fixing each layer, preferably followed by cooling with ambient air, are conducted after coating and prior to coating a subsequent layer The cooling step is preferably conducted using ambient air typically at from 5° C. to 40° C. at from 2 to 20, and preferably 4 to 10 seconds at a suitable flow rate. The combination of the ambient air flow rate and temperature of the gas stream should be sufficient to cool the coating layer. This method permits continuous coating of a plurality of layers on a substrate to form the above described article of the present invention. A preferred method comprises the step of fixing the precious metal component to the refractory oxide and rare earth metal oxide components, the fixing being conducted prior to coating the first and second layers.

In yet another embodiment the method comprises the step of applying a vacuum to the partially immersed substrate at an intensity and a time sufficient to draw the coating media upwardly to a predesignated distance from the bath into each of the channels to form a uniform coating profile therein for each immersion step. Optionally, and preferably the substrate can be turned over to repeat the coating process from the opposite end. The coated substrate should be thermally fixed after forming the layer.

The method can include a final calcining step. This can be conducted in an oven between coating layers or after the coating of all the layers on the substrate has been completed. The calcining can be conducted at from 250° C. to 900° C. at from 0.1 to 10 hours and preferably from 450° C. to 750° C. at from at from 0.5 to 2 hours. After the coating of all layers is complete the substrate can be calcined.

A method aspect of the present invention provides a method for treating a gas containing noxious components comprising one or more of carbon monoxide, hydrocarbons and nitrogen oxides, by converting at least some of each of the noxious components initially present to innocuous substances such as water, carbon dioxide and nitrogen. The method comprises the step of contacting the gas under conversion conditions (e.g., a temperature of about 100° C. to 950° C. of the inlet gas to the catalyst composition) with a catalyst composition as described above.

The following examples are provided to further illustrate various embodiments of this invention and to provide a comparison between the enumerated catalysts of this invention and prior art catalysts. The examples are provided to illustrate the nature of the claimed process and are not intended to limit the scope of the claimed invention. Unless otherwise stated, parts and percentages in the examples ate given by volume.

EXAMPLES

Example 1

Preparation of NOx Trap Sample A

Catalyst A was made by washcoating catalyst slurry on a ceramic monolith substrate having 400 cell per square inch following by a subsequent calcination in air at 450 C for 1 hour. The catalyst slurry consists of the following components: Pt, Li, $Al_2O_3$, and Co/Al oxides. Co/Al mixed oxide was supported on the alumina support via a hydrotalcite route and calcined at 500° C. for 4 hours. Li nitrate was then impregnated on this already calcined Co/Al-alumina powder, and then calcined again at 450° C. for 1 hour. Finally, Pt was impregnated on the Li/Co/Al-alumina powder. Then the power was milled to obtain proper particle size and diluted for washcoating. The final catalyst was calcined at 450° C. for 1 hour. This is considered fresh catalyst. The catalyst was further aged at 700° C. for 4 hours in a stream containing 10% steam in air. The above finished catalyst has the following composition: 90 g/ft$^3$, 0.2 g/in$^3$ $Li_2O$, 1.8 g/in$^3$ Co/Al—$Al_2O_3$. The nominal total washcoat loading is 2.05 g/in$^3$.

The Co/Al mixed oxide in the above preparation was prepared via a hydrotalcite route. Specifically, a mixed Co/Al nitrate solution was prepared which contains 0.5 mil Co and 0.167 mil Al in 250 ml deionized water. A separate NaOH/$Na_2CO_3$ solution was made by dissolving 1.75 mol NaOH and 0.5 mil $Na_2CO_3$ in 1 liter deionized water. 200 g alumina powder with 150 m$^2$/g was suspended in the NaOH/$Na_2CO_3$ solution with vigorous stirring. Allow the suspension to cool to room temperature. The Co/Al nitrate solution was then added to the suspension drop-wise to precipitate the Co and Al. This addition process took about one hour. After the precipitation, the stuffy was heated to 65° C. and held overnight to crystallize the Co/Al precipitate forming a hydrotalcite structure. The resulting slurry was vacuum filtered then washed with deionized water. The wash/filtration process was repeated once. The filter cake was then dried at 110° C. overnight then calcined in air at 500° C. for 4 hours. The crystal structure of the Co/Al compound has a hydrotalcite structure as detected by X-ray diffraction measurement and the structure after the high temperature calcination has a spinel structure.

Example 2

Preparation of NOx Trap Sample B

Same procedures were used as in Sample A. Higher total washcoat and Pt loadings were obtained. This catalyst has the following composition: 150 g/ft$^3$ Pt, 0.3 g/in$^3$ $Li_2O$, and 2.7 g/in$^3$ Co/Al—$Al_2O_3$. Total washcoat loading=3.1 g/in$^3$ The catalyst was further aged at 700° C. for 4 hours in a stream containing 10% steam in air.

Example 3

Preparation of NOx Trap Sample C

The slurry for Catalyst C contains a physical mixture of Pt supported on $Al_2O_3$ (90 g/ft$^3$ Pt, 1.0 g/in$^3$ $Al_2O_3$) and 1.0 g/in$^3$ bulk Li/Co/Al composite. The bulk Li/Co/Al composite is not supported on $A_2O_3$ and was made by using the hydrotalcite approach. Specifically, a mixed Co/Al nitrate solution was prepared which contains 0.5 mol Co and 0.167 mol Al in 250 ml deionized water. A separate NaOH/$Na_2CO_3$ solution was made by dissolving 1.75 mol NaOH and 0.5 mol $Na_2CO_3$ in 1 liter deionized water. Allow the suspension to cool to room temperature. The Co/Al nitrate solution was then added to the suspension drop-wise to precipitate the Co and Al. This addition process look about one hour. After the precipitation, the slurry was heated to 65° C. and held overnight to crystallize the Co/Al precipitate forming a hydrotalcite structure. The resulting slurry was vacuum filtered then washed with deionized water. The wash/filtration process was repeated once. The filler cake was then dried at 110° C. overnight then calcined in air at 500° C. for 4 hours. The crystal structure of the Co/Al compound has a hydrotalcite structure as detected by X-ray diffraction measurement and the structure after the high temperature calcination has a spinel structure. Lithium nitrate is deposited on the calcined Co/Al hydrotalcite then calcined at 450° C. for 1 hour. This resulting composite has an atom ratio Li/Co/Al of 1:3:1. The final catalyst was aged at 700° C. for 4 hours in a stream containing 10% steam in air.

Example 4

Preparation of Sample D

This sample is similar to Sample B in composition. The only difference is that 30 g/ft$^3$ Rh was deposited on the catalyst after the Pt impregnation. The final catalyst was aged at 700° C. for 4 hours in a stream containing 10% steam in air.

Example 5

Preparation of Sample E

This sample was made by immerse Sample B into a Pd aqueous solution to obtained 60 g/ft$^3$ Pd loading. The final catalyst was aged at 700° C. for 4 hours in a stream containing 10% steam in air.

Example 6

Comparative Example

Preparation of Sample F

This NOx trap catalyst was made using the procedures described in Sample A, except the Co/Al oxide was not included in the preparation. The quantity of $Al_2O_3$ was increased accordingly. This catalyst has the following composition: 90 g/ft$^3$, 0.2 g/in$^3$ $Li_2O$, 1.8 g/in$^3$ $Al_2O_3$. Total washcoat loading=2.05 g/in$^3$. The catalyst was aged at 700° C. for 4 hours in a stream Containing 10% steam is air.

Example 7

Comparative Example

Preparation of Sample G

This sample has identical to Sample A but the preparation process is different. The Co in the catalyst was impregnated on the $Al_2O_3$ unlike in Sample A where the Co/Al compound was derived from the hydrotalcite structure. The catalyst was further aged at 700° C. for 4 hours in a stream containing 10% steam in air.

Example 8

Catalyst Testing Conditions

The test was conducted in a reactor under dynamic conditions with synthetic gas mixtures, where the gas environment was alternated from lean to rich at durations of 45 seconds and 1.5 seconds, respectively. During the lean NOx trapping operation, the gas mixture consists of 200 ppm NO, 100 ppm $C_3H_6$, 10% $O_2$, and 10% $H_2O$ in $N_2$, and the rich gas mixture consists of 3% CO, 100 ppm $C_3$ $H_6$, 200 ppm NO and 10% $H_2O$ in N2. The gas hourly space velocity was 25000 for both lean and rich operations. In the case of sulfur tolerance test 20 ppm $SO_2$ was added in the both lean and rich streams and the test was conducted at constant temperature of 250° C. The desulfation was conducted at 550° C. for 10 min with 3% CO, 10% $H_2O$ in $N_2$. NOx conversion efficiency—temperature profiles were obtained in the absence of $SO_2$. An averaged $NO_x$ conversion was obtained over 10 minute run at any given temperature.

Example 9

NOx Conversion Efficiency

Temperature Profiles is the Absence of Sulfur

FIG. 1 compares the dynamic NOx conversions of Samples A to G as a function of temperature. Clearly, the NOx removal efficiency for Samples A to E is much higher than that of Samples F and G at and below 300° C. Temperature below 300° C. is most important for diesel passenger car applications, where the exhaust temperature is generally lower than that of gasoline vehicles. Among these samples, Sample B has the best performance for the whole temperature range. Samples F and G lack of low temperature catalytic activity. Sample F has the same composition as Sample A except that the cobalt composite is absent from the formulation. Interestingly, while Sample G and Sample A have identical composition, their $NO_x$ conversion efficiencies are very different. This difference is the result of different of preparation methodologies employed in these two preparations. In Sample A, cobalt was deposited in a form of Co/Al composite which is derived from a hydrotalcite structure, and in sample G cobalt was simply impregnated using a conventional technique.

Example 10

Effect of $SO_2$ and Desulfation on Sample A

The sulfur tolerance test was formed at a constant temperature (T=250° C.) as a function of time. As shown in FIG. 2, the $NO_x$ conversion decreases continuously with time in a $SO_2$ containing stream due to sulfur poisoning. At the end of the 6 hours run, the catalyst was regenerated at 550° C. with 3% CO for 10 minutes, and the test was repeated for another 6 hours. The $NO_x$ conversion efficiency was completely recovered after the regeneration treatment at 550° C. This represents a breakthrough in sulfur regeneration. Normally, sulfur poisons $NO_x$ trap by forming a much stronger sulfate, which renders the NOx trap ineffective for NOx reduction and requires a much higher temperature (higher than 650° C.) to regenerate. This invention allows the NOx trap catalyst to be effective for NOx reduction with a sulfur containing fuel and sustain its activity by periodic sulfur regeneration. The ability to reverse the sulfur-poisoned catalyst to its initial efficiency is a precondition for a sustainable use of this technology in vehicle applications with any sulfur containing fuel.

Example 11

Effect of $SO_2$ and Desulfation on Sample B

FIG. 3 shows the effect of $SO_2$ and desulfation treatment on Sample B. The NOx efficiency decreases with run time at 250° C. due to $SO_2$ poisoning but with a relatively slower rate compared to Sample A. Upon desulfation treatment, the $NO_x$ efficiency of Sample B was completely recovered.

Example 12

Effect of $SO_2$ and Desulfation on Sample D and E

FIG. 4 is a graph showing a sulfur tolerance test of Sample D at a constant temperature (T=250° C.) as a function of time. FIG. 5 is a graph showing a sulfur tolerance test of Sample D at a constant temperature (T=250° C.) as a function of time. Like Samples A and B, the NOx efficiencies for Samples D and E are completely recovered after a regeneration at 550° C. to remove the deposited sulfur during the run.

Example 13

Effect of $SO_2$ and Desulfation on Sample F

FIG. 6 is a graph showing a sulfur tolerance test of Sample F at a constant temperature (T=250° C.) as a function of time. Sample F has the same composition except that the cobalt composite is not included in the formulation. Because of its low $NO_x$ conversion at 250° C. (sec FIG. 1), the sulfur test was conducted at its optimal temperature –350° C. The $NO_x$ conversion quickly drops to 35% from its initial level of 82% in 6 hours run in the sulfur containing feed. However, after a desulfation treatment at 550° C., its activity only slightly recovered. This shows that Sample F is clearly inferior to Sample A in terms of both $NO_x$ conversion efficiency and the ability to regenerate itself from sulfur poison.

While the invention has been described in detail with respect to specific embodiments thereof, such embodiments are illustrative and the scope of the invention is defined in the appended claims.

I claim:

1. A method for removing $NO_x$ and $SO_x$ contaminants from a gaseous stream comprising the steps of:

[(1) heat treating a catalyst precursor to form a catalyst composite;]

[(2)] *(1)* in a sorbing period, passing a lean gaseous stream comprising $NO_x$ and $SO_x$ within a sorbing temperature range through [the] *a* catalyst composite to sorb at least some of the $SO_x$ contaminants and thereby provide a $SO_x$ depleted gaseous stream exiting the catalyst composite and to sorb and abate at least some of the $NO_x$ contaminants in the gaseous stream and thereby provide a $NO_x$ depleted gaseous stream exiting the catalyst composite;

[(3)] *(2)* in a $SO_x$ desorbing period, converting the lean gaseous stream to a rich gaseous stream and raising the temperature of the gaseous stream to within a desorbing temperature range to thereby reduce and desorb at least some of the $SO_x$ contaminants from the catalyst composite and thereby provide a $SO_x$ enriched gaseous stream exiting the catalyst composite; and

[(4)] *(3)* in a $NO_x$ desorbing period, converting the lean gaseous stream to a rich gaseous stream to thereby reduce and desorb at least some of the $NO_x$ contaminants from the catalyst composite and thereby provide a $NO_x$ enriched gaseous stream exiting the catalyst composite;

wherein the catalyst [precursor] *composite* comprises:

(a) a platinum component;

(b) a support;

(c) a NOx sorbent component; and (d) a spinet material prepared by calcining an anionic clay material represented by the formula $M_mN_n(OH)_{(2m+2n)}A_a.bH_2O$ , wherein M is $Co^{2+}$; N is a trivalent metal cation; A is a mono-, di-, or trivalent anion which decomposes when heated to a temperature sufficient to form a volatile gas; m and n are such that m/n has values from about 0.5 to about 6; a is a number with the proviso that when A is a monovalent anion, a=n, when A is a divalent anion, a=1/2n, and when A is a trivalent anion, a=1/3n; and b is an integer having a value from 1 to about 10.

[2. The method according to claim 1, wherein the catalyst precursor in (1) is heat treated to a temperature ranging from about 150° C. to about 850° C. to form the catalyst composite.]

3. The method according to claim 1, wherein the desorbing temperature range in [(3)] *(2)* is greater than about 500° C.

4. The method according to claim 1, wherein the desorbing temperature range in [(3] *(2)* is from about 600° C. to about 800° C.

5. The method according to claim 1, wherein the catalyst [precursor] *composite* further comprises a platinum group metal component other than platinum.

6. The method according to claim 5, wherein the platinum group metal component is selected from the group consisting of palladium, rhodium, ruthenium, iridium, and osmium components, and mixtures thereof.

7. The method according to claim 1, wherein the support is selected from the group consisting of alumina, silica, titania, and zirconia compounds.

8. The method according to claim 1, wherein the $NO_x$ sorbent component is selected from the group consisting of alkaline earth metal components, alkali metal components, and rare earth metal components.

9. The method according to claim 8, wherein the $NO_x$ sorbent component is selected from the group consisting of oxides of calcium, strontium, and barium, oxides of potassium, sodium, lithium, and cesium, and oxides of cerium, lanthanum, praseodymium, and neodymium.

10. The method according to claim 8, wherein the $NO_x$ sorbent component is at least one alkaline earth metal component and at least one rare earth metal component selected from the group consisting of lanthanum and neodymium.

11. The method according to claim 1, where N in the anionic clay material is selected from the group consisting of $Al^{3+}$, $Ga^{3+}$, $In^{3+}$, $Fe^{3+}$, $Rh^{3+}$, $Co^{3+}$, $La^{3+}$, $SC^{3+}$, and $Y^{3+}$.

12. The method according to claim 1, wherein N in the anionic clay material is selected from the group consisting of $Ce^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, and $Lu^{3+}$.

13. The method according to claim 11, where N in the anionic clay material is $Al^{3+}$.

14. The method according to claim 1, where A in the anionic clay material is selected from the group consisting of $OH^-$, $F^-$, $Cr^-$, $Br^-$, $I^-$, $NO_3^-$, $CO_3^{2-}$, and $SO_4^{2-}$.

15. The method according to claim 1, wherein the ratio of m to n in the anionic clay material ranges from 1 to about 4.

16. The method according to claim 1, wherein the anionic clay material is cobalt-lanthanum aluminum hydrotalcite.

17. The method according to claim 1, wherein the anionic clay material is cobalt-rhodium aluminum hydrotalcite.

18. The method according to claim 1, wherein the catalyst [precursor] *composite* further comprises a zirconium component.

19. The method according to claim 1, comprising:

(i) at least about 1 g/ft$^3$ of the platinum component;

(ii) from about 0.15 g/in$^3$ to about 4.0 g/in$^3$ of the support;

(iii) from about 0.025 g/in$^3$ to about 1 g/in$^3$ of the $NO_x$ sorbent component; and (iv) from about 0.01 g/in$^3$ to about 2 g/in$^3$ of the anionic clay material.

20. The method according to claim 1, wherein the catalyst composite is supported on a metal or ceramic honeycomb carrier or is self-compressed.

21. A method of forming a catalyst composite which comprises forming an admixture of:

(a) a platinum component;

(b) a support;

(c) a NOx sorbent component; and (d) a spinal material prepared by calcining an anionic clay material represented by the formula $M_mN_n(OH)_{(2m+2n)}A_a.bH_2O$ , wherein M is $Co^{2+}$; N is a trivalent metal cation; A is a mono-, di-, or trivalent anion which decomposes when heated to a temperature sufficient to form a volatile gas; m and n are such that into has values from about 0.5 to about 6; a is a number with the proviso that when A is a monovalent anion, a=n, when A is a divalent anion, a=½n, and when A is a trivalent anion, a=⅓n; and b is an integer having a value from 1 to about 10.

22. A method of forming a catalyst composite which comprises the steps of:

(1) forming an admixture of:

(a) a support;

(b) a NOx sorbent component; and (c) a spinel material;

(2) combining a water-soluble or dispersible platinum component and the admixture from step (1) with an aqueous liquid to form a solution or dispersion which is sufficiently dry to absorb essentially all of the liquid;

(3) forming a layer of the solution or dispersion on a substrate; and (4) converting the platinum component in the resulting layer to a water-insoluble form;

wherein the spinet material is prepared by calcining an anionic clay material represented by the formula $M_mN_n(OH)_{(2m+2n)}A_a.bH_2O$, wherein M is a divalent metal cation; N is a trivalent metal cation; A is a mono-, di-, or trivalent anion which decomposes when heated to a temperature sufficient to form a volatile gas; m and n are such that m/n has values from about 0.5 to about 6; a is a number with the proviso that when A is a monovalent anion, a=n, when A is a divalent anion, a=½n, and when A is a trivalent anion, a=⅓n and b is an integer having a value from 1 to about 10.

23. A catalyst composite comprising:

(a) a platinum component;

(b) a support;

(c) a NOx sorbent component; and (d) a spinet material prepared by calcining an anionic clay material represented by the formula $M_mN_n(OH)_{(2m+2n)}A_a.bH_2O$, wherein M is $Co^{2+}$; N is a trivalent metal cation; A is a mono-, di-, or trivalent anion which decomposes when heated to a temperature sufficient to form a volatile gas; m and n are such that m/n has values from about 0.5 to about 6; a is a number with the proviso that when A is a monovalent anion, a=n, when A is a divalent anion, a=½n, and when A is a trivalent anion, a=⅓n; and b is an integer having a value from 1 to about 10.

24. The catalyst composite according to claim 23, further comprising a platinum group metal component other than platinum.

25. The catalyst composite according to claim 24, wherein the platinum group metal component is selected from the group consisting of palladium, rhodium, ruthenium, iridium, and osmium components, and mixtures thereof.

26. The catalyst composite according to claim 23, wherein the support is selected from the group consisting of alumina, silica, titania, and zirconia compounds.

27. The catalyst composite according to claim 23, wherein the $NO_x$ sorbent component is selected from the group consisting of alkaline earth metal components, alkali metal components, and rare earth metal components.

28. The catalyst composite according to claim 27, wherein the $NO_x$ sorbent component is selected from the group consisting of oxides of calcium, strontium, and barium, oxides of potassium, sodium, lithium, and cesium, and oxides of cerium, lanthanum, praseodymium, and neodymium.

29. The catalyst composite according to claim 27, wherein the $NO_x$ sorbent component is at least one alkaline earth metal component and at least one rare earth metal component selected from the group consisting of lanthanum and neodymium.

30. The catalyst composite according to claim 23, where N in the anionic clay material is selected from the group consisting of $Al^{3+}$, $Ga^{3+}$, $In^{3+}$, $Fe^{3+}$, $Rh^{3+}$, $Co^{3+}$, $B^{3+}$, $Cr^{3+}$, $La^{3+}$, $Sc^{3+}$, and $Y^{3+}$.

31. The catalyst composite according to claim 30, where N is $Al^{3+}$.

32. The catalyst composite according to claim 23 wherein N in the anionic clay material is selected from the group consisting of $Ce^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, and $Lu^{3+}$.

33. The catalyst composite according to claim 23, where A in the anionic clay material is selected from the group consisting of $OH^-$, $F^-$, $Cl^-$, $Br^-$, $I^-$, $NO_3^-$, $CO_3^{2-}$, and $SO_4^{2-}$.

34. The catalyst composite according to claim 23wherein the ratio of m to n in the anionic clay material ranges from 1 to about 4.

35. The catalyst composite according to claim 23, wherein the anionic clay material is cobalt-lanthanum aluminum hydrotalcite.

36. The catalyst composite according to claim 23, wherein the anionic clay material is cobalt-rhodium aluminum hydrotalcite.

37. The catalyst composite according to claim 23, further comprising a zirconium component.

38. The catalyst composite according to claim 23, comprising:

(i) at least about 1 g/ft$^3$ of the platinum component;

(ii) from about 0.15 g/in$^3$ to about 4.0 g/in$^3$ of the support;

(iii) from about 0.025 g/in$^3$ to about 1 g/in$^3$ of the $NO_x$ sorbent component; and (iv) from about 0.01 g/in$^3$ to about 2 g/in$^3$ of the anionic clay material.

39. The catalyst composite according b claim 23, wherein the catalyst composite is supported on a metal or ceramic honeycomb carrier or is self-compressed.

40. A method for removing $NO_x$ and $SO_x$ contaminants from a gaseous stream comprising the steps of:

[(1) heat treating a catalyst precursor to form a catalyst composite;]

[(2)] *(1)* in a sorbing period, passing a lean gaseous stream comprising $NO_x$ and $SO_x$ within a sorbing temperature range through [the] *a* catalyst composite to sorb at least some of the $SO_x$ contaminants and thereby provide a $SO_x$ depleted gaseous stream exiting the catalyst composite and to sorb and abate at least some of the $NO_x$ contaminants in the gaseous stream and thereby provide a $NO_x$ depleted gaseous stream exiting the catalyst composite;

[(3)] *(2)* in a $SO_x$ desorbing period, converting the lean gaseous stream to a rich gaseous stream and raising the temperature of the gaseous stream to within a desorbing temperature range to thereby reduce and desorb at least some of the $SO_x$ contaminants from the catalyst composite and thereby provide a $SO_x$ enriched gaseous stream exiting the catalyst composite; and

[(4)] *(3)* in a $NO_x$ desorbing period, converting the lean gaseous stream to a rich gaseous stream to thereby reduce and desorb at least some of the $NO_x$ contaminants from the catalyst composite and thereby provide a $NO_x$ enriched gaseous stream exiting the catalyst composite;

wherein the catalyst [precursor] *composite* comprises:

(a) a platinum component;

(b) a support;

(c) a NOx sorbent component; and (d) a spinel material prepared by calcining an anionic clay material represented by the formula $M_mN_n(OH)_{(2m+2n)}A_a.bH_2O$, wherein M is a divalent metal cation; N is selected from the group consisting of $Ce^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, and $Lu^{3+}$, A is a mono-, di-, or trivalent anion which decomposes when heated to a temperature sufficient to form a volatile gas; m and n are such that m/n has values from about 0.5 to about 6; a is a number with the proviso that when A is a monovalent anion, a=n, when A is a divalent anion, [a ½n] *a=½n*, and when A is a trivalent anion, a=⅓n; and b is an integer having a value from 1 to about 10.

[41. The method according to claim 40, wherein the catalyst precursor in (1) is heat treated to a temperature ranging from about 150° C. to about 850° C. to form the catalyst composite.]

42. The method according to claim 40, wherein the desorbing temperature range in [(3)] (*2*) is greater than about 500° C.

43. The method according to claim 40, wherein the desorbing temperature range in [(3)] (*2*) is from about 600° C. to about 800° C.

44. The method according to claim 40, wherein the catalyst [precursor] *composite* further comprises a platinum group metal component other than platinum.

45. The method according to claim 44, wherein the platinum group metal component is selected from the group consisting of palladium, rhodium, ruthenium, iridium, and osmium components, and mixtures thereof.

46. The method according to claim 40, wherein the support is selected from the group consisting of alumina, silica, titania, and zirconia compounds.

47. The method according to claim 40, wherein the $NO_x$ sorbent component is selected from the group consisting of alkaline earth metal components, alkali metal components, and rare earth metal components.

48. The method according to claim 47, wherein the $NO_x$ sorbent component is selected from the group consisting of oxides of calcium, strontium, and barium, oxides of potassium, sodium, lithium, and cesium, and oxides of cerium, lanthanum, praseodymium, and neodymium.

49. The method according to claim 47, wherein the $NO_x$ sorbent component is at least one alkaline earth metal component and at least one rare earth metal component selected from the group consisting of lanthanum and neodymium.

50. The method according to claim 40, where M in the anionic clay material is selected from the group consisting of $Co^{2+}$, $Ni^{2+}$, $Cu^{2+}$, $Pd^{2+}$, $Zn^{2+}$, $Mn^{2+}$, $Mg^{2+}$, and $Fe^{2+}$.

51. The method according to claim 50, where M in the anionic clay material is selected from the group consisting of $Co^{2+}$, $Ni^{2+}$, $Cu^{2+}$, $Pd^{2+}$, and $Mg^{2+}$.

52. The method according to claim 51, where M in the anionic clay material is $Co^{2+}$.

[53. The method according to claim 40, where N in the anionic clay material is $Al^{3+}$.]

54. The method according to claim 40, where A in the anionic clay material is selected from the group consisting of $OH^-$, $F^-$, $Cl^-$, $Br^-$, $I^-$, $NO_3^-$, $Co_3^{2-}$, and $SO_4^-$.

55. The method according to claim 40, wherein the ratio of m to n in the anionic clay material ranges from 1 to about 4.

[56. The method according to claim 40, wherein the anionic clay material is cobalt-lanthanum aluminum hydrotalcite.]

[57. The method according to claim 40, wherein the anionic clay material is cobalt-rhodium aluminum hydrotalcite.]

58. The method according to claim 40, wherein the catalyst [precursor] *composite* further comprises a zirconium component.

59. The method according to claim 40, comprising:

(i) at least about 1 gm/ft$^3$ of the platinum component;

(ii) from about 0.15 g/in$^3$ to about 4.0 g/in$^3$ of the support;

(iii) from abort 0.025 g/in$^3$ to about 1 g/in$^3$ of the $NO_x$ sorbent component; and (iv) from about 0.01 g/in$^3$ to about 2 g/in$^3$ of the anionic clay material.

60. The method according to claim 40, wherein the catalyst composite is supported on a metal or ceramic honeycomb carrier or is selfcompressed.

61. A method of forming a catalyst composite which comprises forming an admixture of:

(a) a platinum component;

(b) a support;

(c) a NOx sorbent component; and (d) a spinel material prepared by calcining an anionic clay material represented by the formula $M_mN_n(OH)_{(2m+2n)}A_a.bH_2O$, wherein M is a divalent metal cation; N is selected from the group consisting of $Ce^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, and $Lu^{3+}$, A is a mono-, di-, or trivalent anion which decomposes when heated to a temperature sufficient to form a volatile gas; m and n are such that m/n has values from about 0.5 to about 6; a is a number with the proviso that when A is a monovalent anion, a=n, when A is a divalent anion, a=½n, and when A is a trivalent anion, a=⅓n; and b is an integer having a value from 1 to about 10.

62. A catalyst composite comprising.

(a) a platinum component;

(b) a support;

(c) a NOx sorbent component; and (d) a spinel material prepared by calcining an anionic clay material represented by the formula $M_mN_n(OH)_{(2m+2n)}A_a.bH_2O$, wherein M is a divalent metal cation; N is selected from the group consisting of $Co^{3+}$, $Nd^{3+}$, $Pm^{3+}$, $Sm^{3+}$, $Eu^{3+}$, $Gd^{3+}$, $Th^{3+}$, $Dy^{3+}$, $Ho^{3+}$, $Er^{3+}$, $Tm^{3+}$, $Yb^{3+}$, and $Lu^{3+}$, A is a mono-, di-, or trivalent anion which decomposes when heated to a temperature sufficient to form a volatile gas; m and n are such that m/n has values from about 0.5 to about 6; a is a number with the proviso that when A is a monovalent anion, a=n, when A is a divalent anion, a=½n, and when A is a trivalent anion, a=½n; and b is an integer having a value from 1 to about 10.

63. The catalyst composite according to claim 62, further comprising a platinum group metal component other than platinum.

64. The catalyst composite according to claim 63, wherein the platinum group metal component is selected from the group consisting of palladium, rhodium, ruthenium, iridium, and osmium components, and mixtures thereof.

65. The catalyst composite according to claim 62, wherein the support is selected from the group consisting of alumina, silica, titania, and zirconia compounds.

66. The catalyst composite according to claim 62, wherein the $NO_x$ sorbent component is selected from the group consisting of alkaline earth metal components, alkali metal components, and rare earth metal components.

67. The catalyst composite according to claim 66, wherein the $NO_x$ sorbent component is selected from the group consisting of oxides of calcium, strontium, and barium, oxides of potassium, sodium, lithium, and cesium, and oxides of cerium, lanthanum, praseodymium, and neodymium.

68. The catalyst composite according to claim 66, wherein the $NO_x$ sorbent component is at least one alkaline earth metal component and at least one rare earth metal component selected from the group consisting of lanthanum and neodymium.

69. The catalyst composite according to claim 62, where M in the anionic clay material is selected from the group consisting of $Co^{2+}$, $Ni^{2+}$, $Cu^{2+}$, $Pd^{2+}$, $Zn^{2+}$, $Mn^{2+}$, $Mg^{2+}$, and $Fe^{2+}$.

70. The catalyst composite according to claim 69, where M in the anionic clay material is selected from the group consisting of $Co^{2+}$, $Ni^{2+}$, $Cu^{2+}$, $Pd^{2+}$, and $Mg^{2+}$.

71. The catalyst composite according to claim 70, where M in the anionic clay material is $Co^{2+}$.

72. The catalyst composite according to claim 62, where N is $Al^{3+}$.

73. The catalyst composite according to claim 62, where A in the anionic clay material is selected from the group consisting of $OH^-$, $F^-$, $Cl^-$, $Br^-$, $I^-$, $NO_{3-}$, $CO_3^{2-}$, and $SO_4^{2-}$.

74. The catalyst composite according to claim 62 wherein the ratio of m to n in the anionic clay material ranges from 1 to about 4.

75. The catalyst composite according to claim 62, wherein the anionic clay material is cobalt-lanthanum aluminum hydrotalcite.

76. The catalyst composite according to claim 62, wherein the anionic clay material is cobalt-rhodium aluminum hydrotalcite.

77. The catalyst composite according to claim 62, further comprising a zirconium component.

78. The catalyst composite according to claim 62, comprising:

(i) at least about 1 $g/ft^3$ of the platinum component;

(ii) from about 0.15 $g/in^3$ to about 4.0 $g/in^3$ of the support;

(iii) from about 0.025 $g/in^3$ to about 1 $g/in^3$ of the $NO_x$ sorbent component; and (iv) from about 0.01 $g/in^3$ to about 2 $g/in^3$ of the anionic clay material.

79. The catalyst composite according to claim 62, wherein the catalyst composite is supported on a metal or ceramic honeycomb carrier or is self-compressed.

* * * * *